US011451067B2

(12) United States Patent
Regupathy et al.

(10) Patent No.: US 11,451,067 B2
(45) Date of Patent: Sep. 20, 2022

(54) METHOD, APPARATUS AND SYSTEM TO ENHANCE A DEVICE POLICY MANAGER TO MANAGE DEVICES BASED ON BATTERY CONDITION

(71) Applicant: Intel Corporation, Santa Clara, CA (US)

(72) Inventors: Rajaram Regupathy, Bangalore (IN); Nirmala Bailur, Bangalore (IN); Rajeev Muralidhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1003 days.

(21) Appl. No.: 15/847,862

(22) Filed: Dec. 19, 2017

(65) Prior Publication Data

US 2019/0036365 A1 Jan. 31, 2019

(51) Int. Cl.
*H02J 7/00* (2006.01)
*G06F 13/38* (2006.01)
*G06F 13/42* (2006.01)
*G06F 1/26* (2006.01)

(52) U.S. Cl.
CPC .............. *H02J 7/00* (2013.01); *G06F 13/385* (2013.01); *H02J 7/00032* (2020.01); *H02J 7/00034* (2020.01); *H02J 7/0047* (2013.01); *G06F 1/266* (2013.01); *G06F 13/42* (2013.01); *G06F 2213/0042* (2013.01); *H02J 7/00036* (2020.01); *H02J 7/00038* (2020.01); *H02J 7/0048* (2020.01)

(58) Field of Classification Search
CPC ... G06F 13/385; H02J 7/0047; H02J 7/00047; H02J 7/00036; H02J 7/342

USPC .......................................................... 320/137
See application file for complete search history.

(56) References Cited

U.S. PATENT DOCUMENTS

| 5,363,031 | A | * | 11/1994 | Miller | H02J 7/0078 |
| | | | | | 320/115 |
| 5,592,069 | A | * | 1/1997 | Dias | H01M 10/4257 |
| | | | | | 320/106 |
| 5,652,502 | A | * | 7/1997 | van Phuoc | H02J 7/00 |
| | | | | | 702/63 |
| 5,694,024 | A | * | 12/1997 | Dias | H02J 7/00036 |
| | | | | | 320/106 |

(Continued)

OTHER PUBLICATIONS

"What's the role of CC pin in Type-C solution," Yucheng, Silicon Labs, published online Sep. 26, 2016, accessed online Jan. 30, 2021, https://www.silabs.com/community/mcu/8-bit/knowledge-base.entry.html/2016/09/26/what_s_the_role_ofc-kQYe (Year: 2016).*

(Continued)

*Primary Examiner* — John T Trischler
(74) *Attorney, Agent, or Firm* — Nicholson De Vos Webster & Elliott LLP

(57) ABSTRACT

A method and device that implements communication over an interconnect to support improved power distribution over the interconnect. The device includes a controller to implement a device policy manager (DPM) to manage power allotment over the interconnect, and a battery feedback mechanism coupled to the controller, the battery feedback mechanism to detect a low or dead battery condition of a connected device over the interconnect and to indicate to the DPM to advertise a higher power charging level to the connected device.

12 Claims, 15 Drawing Sheets

(56) References Cited

U.S. PATENT DOCUMENTS

| | | | | |
|---|---|---|---|---|
| 5,734,252 A * | 3/1998 | Griffin | H02J 7/00047 | 320/124 |
| 5,751,136 A * | 5/1998 | Takechi | H01M 10/486 | 320/150 |
| 5,867,006 A * | 2/1999 | Dias | H01M 10/4257 | 320/106 |
| 5,955,869 A * | 9/1999 | Rathmann | G01R 31/3648 | 320/132 |
| 6,018,228 A * | 1/2000 | Dias | H02J 7/00036 | 320/106 |
| 6,025,695 A * | 2/2000 | Friel | H02J 7/00036 | 320/106 |
| 6,137,261 A * | 10/2000 | Kurle | G01R 31/3648 | 320/132 |
| 6,229,280 B1 * | 5/2001 | Sakoh | G01R 31/3646 | 320/106 |
| 6,459,175 B1 * | 10/2002 | Potega | H02J 7/00041 | 307/149 |
| 6,611,552 B2 * | 8/2003 | Beck | G06F 13/4086 | 375/219 |
| 6,969,970 B2 * | 11/2005 | Dias | G01K 7/13 | 320/106 |
| 7,402,981 B2 * | 7/2008 | May | H02J 7/0068 | 320/137 |
| 7,523,338 B2 * | 4/2009 | Fu | G06F 1/266 | 713/300 |
| 7,550,951 B2 * | 6/2009 | Lai | H02J 7/0047 | 320/162 |
| 7,624,202 B2 * | 11/2009 | Monks | G06F 1/266 | 710/15 |
| 7,631,111 B2 * | 12/2009 | Monks | H04L 12/10 | 710/15 |
| 7,733,060 B2 * | 6/2010 | Kojima | H02J 7/0032 | 320/125 |
| 7,890,298 B2 * | 2/2011 | Coskun | G06F 9/5094 | 702/186 |
| 7,984,318 B2 * | 7/2011 | Fu | G06F 1/266 | 713/340 |
| 8,332,545 B1 * | 12/2012 | Monks | G06F 13/4291 | 710/8 |
| 8,639,954 B2 * | 1/2014 | Winkler | H02J 7/0068 | 713/300 |
| 8,862,921 B1 * | 10/2014 | Kim | G06F 1/32 | 713/323 |
| 8,880,748 B2 * | 11/2014 | Monks | G06F 13/4291 | 710/8 |
| 8,938,634 B2 * | 1/2015 | Kruglick | G06F 1/3246 | 713/324 |
| 9,030,152 B2 * | 5/2015 | Liang | H01M 10/48 | 320/103 |
| 9,136,724 B2 * | 9/2015 | Ye | H02J 7/0068 | |
| 9,142,982 B2 * | 9/2015 | Chen | H02J 7/0048 | |
| 9,207,994 B2 * | 12/2015 | Seshadri | G06F 1/3206 | |
| 9,310,868 B2 * | 4/2016 | Waters | G06F 1/263 | |
| 9,336,170 B2 * | 5/2016 | Hong | G06F 13/4072 | |
| 9,525,294 B2 * | 12/2016 | Hong | H02J 7/00 | |
| 9,575,917 B1 * | 2/2017 | Zhu | G06F 13/385 | |
| 9,632,555 B2 * | 4/2017 | Lester | G06F 13/00 | |
| 9,728,983 B2 * | 8/2017 | Lun Li | H02J 7/00 | |
| 9,766,674 B2 * | 9/2017 | Dunstan | G06F 13/385 | |
| 9,774,209 B2 * | 9/2017 | Lin | H02J 7/025 | |
| 9,806,547 B2 * | 10/2017 | Carre | H02J 7/00 | |
| 9,811,136 B2 * | 11/2017 | Waters | G06F 1/263 | |
| 9,812,884 B2 * | 11/2017 | Schwartz | G06F 1/3209 | |
| 9,831,693 B2 * | 11/2017 | Tan | G06F 1/266 | |
| 9,923,390 B2 * | 3/2018 | Chen | H02J 7/0069 | |
| 9,934,048 B2 * | 4/2018 | Muralidhar | G06F 9/3212 | |
| 10,078,608 B2 * | 9/2018 | Kadgi | G06F 13/385 | |
| 10,277,059 B2 * | 4/2019 | Der | H02J 7/06 | |
| 10,283,975 B1 * | 5/2019 | Venkatasamy | H02J 7/00 | |
| 10,379,874 B1 * | 8/2019 | Venkatasamy | G06F 1/3212 | |
| 10,521,386 B2 * | 12/2019 | Kadgi | G06F 11/3051 | |
| 10,581,256 B2 * | 3/2020 | Jung | G01R 31/392 | |
| 10,615,610 B1 * | 4/2020 | Jelinek | H02J 7/0021 | |
| 10,671,404 B2 * | 6/2020 | Muralidhar | G06F 9/4411 | |
| 10,725,518 B2 * | 7/2020 | Lester | G06F 13/385 | |
| 10,727,545 B1 * | 7/2020 | Gan | H01M 4/382 | |
| 10,754,402 B2 * | 8/2020 | Atkinson | G06F 11/1423 | |
| 10,790,682 B2 * | 9/2020 | Hand | H02J 7/0068 | |
| 10,790,689 B2 * | 9/2020 | Krishna | H02J 7/00714 | |
| 2002/0117993 A1 * | 8/2002 | Dias | H02J 7/00047 | 320/106 |
| 2002/0172271 A1 * | 11/2002 | Beck | H04L 25/028 | 375/219 |
| 2003/0189417 A1 * | 10/2003 | Dias | H02J 7/00036 | 320/134 |
| 2004/0164708 A1 * | 8/2004 | Veselic | H02J 7/0071 | 320/132 |
| 2005/0001595 A1 * | 1/2005 | May | H02J 7/0068 | 320/140 |
| 2005/0151505 A1 * | 7/2005 | Dias | H01M 10/4257 | 320/106 |
| 2006/0043928 A1 * | 3/2006 | Nakasho | H02J 7/007194 | 320/112 |
| 2007/0001646 A1 * | 1/2007 | Kojima | H02J 7/0029 | 320/128 |
| 2007/0088967 A1 * | 4/2007 | Fu | G06F 1/266 | 713/340 |
| 2008/0042616 A1 * | 2/2008 | Monks | H04L 12/10 | 320/106 |
| 2008/0126594 A1 * | 5/2008 | Monks | G06F 1/266 | 710/17 |
| 2008/0129251 A1 * | 6/2008 | Lam | H02J 7/0045 | 320/149 |
| 2008/0136373 A1 * | 6/2008 | Lai | H02J 7/045 | 320/128 |
| 2008/0252262 A1 * | 10/2008 | Buhler | H02J 7/0072 | 320/149 |
| 2009/0210739 A1 * | 8/2009 | Fu | G06F 1/266 | 713/340 |
| 2009/0278506 A1 * | 11/2009 | Winger | H02J 7/0068 | 320/160 |
| 2010/0207575 A1 * | 8/2010 | Pijnenburg | H02J 50/10 | 320/108 |
| 2010/0244784 A1 * | 9/2010 | Li | H02J 7/0072 | 320/163 |
| 2011/0127953 A1 * | 6/2011 | Walley | H02J 50/12 | 320/108 |
| 2011/0145445 A1 * | 6/2011 | Malamant | G06F 1/3287 | 710/16 |
| 2011/0279095 A1 * | 11/2011 | Hong | H02J 7/00 | 320/164 |
| 2011/0298426 A1 * | 12/2011 | Hussain | H02J 7/0069 | 320/128 |
| 2012/0159220 A1 * | 6/2012 | Winkler | H02J 7/0068 | 713/323 |
| 2012/0311203 A1 * | 12/2012 | Monks | G06F 13/4291 | 710/63 |
| 2013/0073777 A1 * | 3/2013 | Monks | G06F 13/4291 | 710/316 |
| 2013/0082638 A1 * | 4/2013 | Liang | H02J 7/342 | 320/103 |
| 2013/0082662 A1 * | 4/2013 | Carre | H02J 7/0068 | 320/134 |
| 2013/0119922 A1 * | 5/2013 | Chen | H02J 7/0069 | 320/107 |
| 2013/0154560 A1 * | 6/2013 | Walley | H02J 50/10 | 320/108 |
| 2013/0191672 A1 * | 7/2013 | Kruglick | G06F 1/3246 | 713/324 |
| 2013/0290765 A1 * | 10/2013 | Waters | G06F 1/266 | 713/340 |
| 2013/0318379 A1 * | 11/2013 | Seshadri | G06F 1/3287 | 713/320 |
| 2014/0132216 A1 * | 5/2014 | Tan | G06F 1/263 | 320/114 |
| 2015/0097520 A1 * | 4/2015 | Lin | H02J 7/025 | 320/108 |

(56) References Cited

U.S. PATENT DOCUMENTS

| | | | |
|---|---|---|---|
| 2015/0123595 A1* | 5/2015 | Hussain | H02J 7/00 320/107 |
| 2015/0216273 A1* | 8/2015 | Akin | H02J 7/0027 135/16 |
| 2015/0216274 A1* | 8/2015 | Akin | H02J 7/025 135/16 |
| 2015/0301552 A1* | 10/2015 | Lim | G01K 7/16 327/538 |
| 2015/0340898 A1* | 11/2015 | Schwartz | H02J 7/342 320/103 |
| 2015/0349552 A1* | 12/2015 | Chen | H02J 7/0036 320/162 |
| 2015/0378409 A1* | 12/2015 | Dunstan | G06F 13/385 713/310 |
| 2016/0163480 A1* | 6/2016 | Lester | G06F 1/26 713/300 |
| 2016/0164322 A1* | 6/2016 | Li | H02J 7/00 320/137 |
| 2016/0233710 A1* | 8/2016 | Hong | H02J 7/0068 |
| 2016/0239063 A1* | 8/2016 | Waters | G06F 1/266 |
| 2016/0336782 A1* | 11/2016 | Vilhauer | H02J 50/12 |
| 2016/0380441 A1* | 12/2016 | Groat | H02J 7/0071 320/107 |
| 2017/0040813 A1* | 2/2017 | Hu | H02J 7/02 |
| 2017/0286125 A1* | 10/2017 | Muralidhar | G06F 9/4411 |
| 2017/0293338 A1* | 10/2017 | Lester | G06F 13/385 |
| 2018/0081843 A1* | 3/2018 | Kadgi | G06F 13/20 |
| 2018/0131218 A1* | 5/2018 | Shellhammer | A61N 1/3787 |
| 2018/0145517 A1* | 5/2018 | Krishna | H02J 7/045 |
| 2018/0173538 A1* | 6/2018 | Muralidhar | G06F 9/4411 |
| 2018/0262027 A1* | 9/2018 | Jung | H02J 7/0047 |
| 2018/0309315 A1* | 10/2018 | Der | H02J 50/80 |
| 2018/0356873 A1* | 12/2018 | Regupathy | G06F 1/3287 |
| 2019/0025897 A1* | 1/2019 | Atkinson | G06F 11/3027 |
| 2019/0026115 A1* | 1/2019 | Dou | G06F 9/4401 |
| 2019/0065422 A1* | 2/2019 | Sporck | G06F 13/385 |
| 2019/0065423 A1* | 2/2019 | Kadgi | G06F 1/266 |
| 2019/0086994 A1* | 3/2019 | Regupathy | G06F 1/266 |
| 2019/0121764 A1* | 4/2019 | Regupathy | H04L 41/0893 |
| 2019/0305568 A1* | 10/2019 | Hand | H02J 7/0068 |
| 2020/0028368 A1* | 1/2020 | Nook | H02J 7/0016 |
| 2020/0220367 A1* | 7/2020 | Cho | H02J 7/342 |
| 2020/0301492 A1* | 9/2020 | Regupathy | G06F 1/263 |
| 2020/0329040 A1* | 10/2020 | Regupathy | H04L 9/3271 |
| 2021/0055777 A1* | 2/2021 | Regupathy | G06F 13/4295 |

OTHER PUBLICATIONS

IEEE Std 802.11a-1999 (R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.

PCI Express® Base Specification Revision 3.0, Nov. 10, 2010, 860 pages.

"Universal Serial Bus 3.2 Specification," Revision 1.0, USB 3.0 Promoter Group, Sep. 22, 2017, 548 pages.

"Universal Serial Bus Power Delivery Specification," Revision 3.0, V1.1, Jan. 12, 2017, 579 pages.

"Universal Serial Bus Specification", Revision 2.0, The Universal Serial Bus Implementation Forum (USB-IF), Apr. 27, 2000, 622 pages.

"Universal Serial Bus Type-C Cable and Connector Specification," Release 1.3, Jul. 14, 2017, 241 pages.

"USB Battery Charging 1.2," Compliance Plan, Revision 1.0, Oct. 12, 2011, 166 pages.

WiGig White Paper, Wireless Gigabit Alliance, Defining the Future of Multi-Gigabit Wireless Communications, Jul. 2010, 5 pages.

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | $V_{BUS}$ | CC1 | D+ | D- | SBU1 | $V_{BUS}$ | RX2- | RX2+ | GND |
| GND | RX1+ | RX1- | $V_{BUS}$ | SBU2 | D- | D+ | CC2 | $V_{BUS}$ | TX2- | TX2+ | GND |
| B12 | B11 | B10 | B9 | B8 | B7 | B6 | B5 | B4 | B3 | B2 | B1 |

METHOD, APPARATUS AND SYSTEM TO ENHANCE A DEVICE POLICY MANAGER TO MANAGE DEVICES BASED ON BATTERY CONDITION

TECHNICAL FIELD

Embodiments of the invention relate to the field of Universal Serial Bus (USB) operation; and more specifically, to the configuration of USB operation to provide an increased power current to devices with dead or low battery levels.

BACKGROUND

The Universal Serial Bus (USB) standard is a standard that defines cables, connections and communication protocols used for connection, communication and power supply between electronic devices. The USB standard has evolved over time to utilize various connector types and support varying features. Amongst these USB standards is the USB Type-C (herein USB-C) standard that defines a reversible plug connector for USB devices. The Type-C plug connects to electronic devices that function as both hosts and connected devices.

Connecting an electronic device to a host device such as computing system having a motherboard, central processing unit (CPU) and similar components encompasses having circuitry that detects the connection of the electronic device. Where a device is connected via a USB-C connector port, there is circuitry that detects the connection of a cable and electronic device to the connector port. This enables the software and circuitry that manage the USB communication protocols to initiate communication and power controls for the connected device.

The USB port, which used to be primarily for data transfer and low power devices has evolved to add power charging capabilities of up to 100 Watts. USB has been augmented to support different protocols and high-speed data using a USB port typed called the USB-C type port. These new capabilities of USB and the USB ports are defined through updated specifications including the USB Type-C™ Cable and Connector Specification Revision 1.3 of Jul. 14, 2017, USB Power Delivery (PD) Specification Rev. 3.0, Version 1.1 of Jan. 12, 2017, and the USB 3.2 Specification released Sep. 22, 2017. These upgrades to USB however do not change the basic point-to-point nature of USB connections, whereby, each device operates in a one-to-one relationship with the device connected to it. Further, the USB PD specification provides a minimum current to connected devices that have insufficient power to negotiate higher power charging levels.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
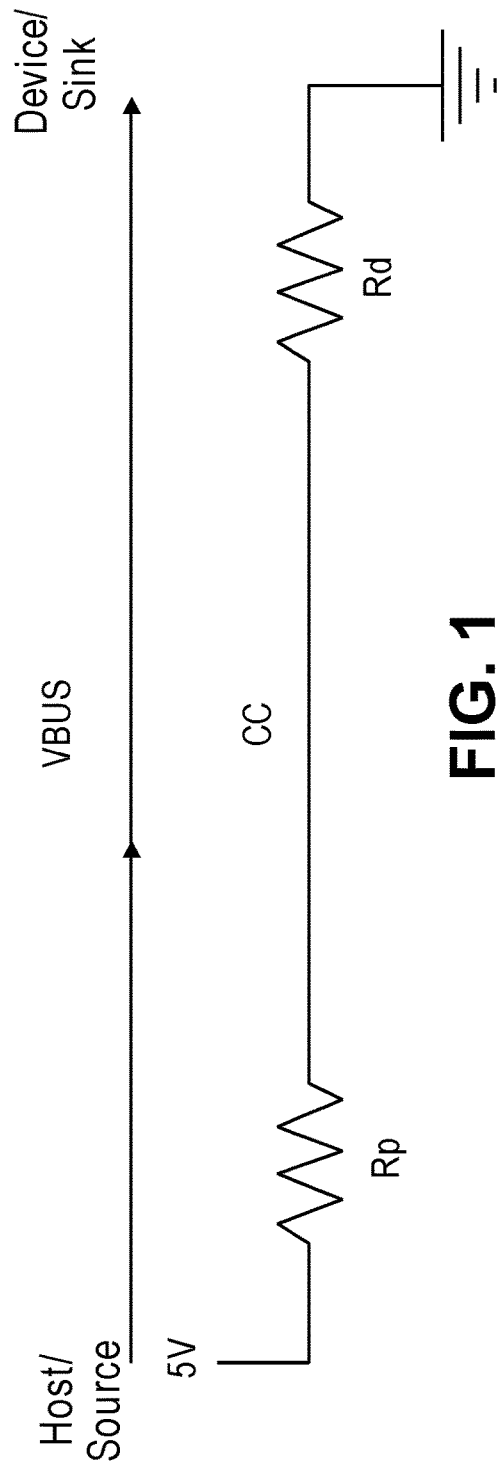
FIG. 1 is a diagram of the source sink connection over a connected medium.

The following description describes methods and apparatus to improve power management for Universal Serial Bus (USB) devices. In particular to define a process and apparatus to negotiate power charging levels above the minimum power charging levels in scenarios where the device that is a power sink has a dead battery or battery in a low power state. The process and apparatus provides a dead battery feedback component or dead battery indicator that enables a device policy manager to identify these cases and enable a negotiation of a higher supported power level to avoid utilizing a minimum power charge level where the device functioning as the power source and the device functioning as a power sink both support a power charging level above the defined minimum power charging level for USB.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments provide a mechanism and process to improve the handling of power charging levels where a connected device has no battery power or is operating in a low battery power state. The USB port is capable of supporting power delivery of up to 100 Watts. This capability of a USB port is defined through specification such as USB Type-C™ Cable and Connector Specification Revision 1.3 of Jul. 14, 2017, and USB Power Delivery (PD) Specification Rev. 3.0, Version 1.1, of Jan. 12, 2017. These specifications define devices which that have a Dual Role Power (DRP) capability, where the device can function as a power source or a power sink. These specifications also define devices with the capability of Dual Role Data (DRD), where the devices can act as both a host and a device.

USB includes a configuration process that is used to determine connection and orientation of a USB port and to determine an initial power role and an initial data role. This configuration process is carried out over a Configuration Channel (CC) signal line. An attach or detach action or state is determined by a specified resistance to ground on the CC signal line. Using, the CC signal line a device that provides a power source presents a specific resistance, a pull-up resistance (Rp) and a device that is a power sink presents a specific resistance, a pull-down resistance (Rd) on the CC signal line to start the configuration process.

FIG. 1 is a diagram of the source sink connection over a connected medium. In the illustration of FIG. 1 a host (i.e., a computing device functioning as a USB host) is shown connected via the CC and a VBUS (power buss) to a device (i.e., a computing device functioning as a USB device). The USB host in this example is a power source and the USB device is a power sink. Thus, a current flows from the USB host to the USB device over the VBUS. The USB host presents a resistance Rp on the CC signal line and the USB device presents the resistance Rd on CC signal line. While the example shows a case where a USB host is the power source, in other embodiments and cases, a USB device may be a power source. A used herein, a 'device,' refers to an electronic or computing device and a 'USB device' to a device that is functioning in the role of a USB device as defined in the USB specifications.

A device that is a power source can present three different Rp resistances on the CC signal line to advertise current power levels that are supported by the device that is the power source. A power sink uses a difference in the resistance on the CC line to determine the power current it could draw from the device that is the power source and the device that is the power sink has to be aware of dynamic changes in the presented resistance Rp by the device functioning as the power source. The three different current levels supported as defined by the USB PD specification and the Rp resistances of a power source is illustrated in the Table-I below:

TABLE I

| Source Advertisement | Resistor Pullup to 4.75-5.5 V | Resistor Pullup 3.3 V +/−5% |
| --- | --- | --- |
| 900 mA@5 V | 56k ohms | 36k ohms |
| 1.5 A@5 V | 22k ohms | 12k ohms |
| 3 A@5 V | 10k ohms | 4.7k ohms |

To negotiate for higher power charging level of up to 100 W (20V/5 A), a protocol negotiation defined by the USB PD specification is used.

A device implementing the USB Type-C specification and USB PD specification with a USB device port is required to manage its load to stay within the current power charging level offered by the USB host or hub, including dynamically scaling back the load if the USB host or hub port changes its advertisement to a lower power charging level as indicated by an advertisement of a lower power charging level over the CC pins.

Three current levels at default VBUS power charging levels are defined by USB Type-C specification and USB PD, the available power charging values when configured for high-power operation as defined by the various USB specifications are a (1) minimum level, which is 500 mA for USB 2.0 ports and 900 mA for USB 3.1 ports, (2) 1.5 A or (3) 3.0 A.

According to the USB PD specification, when in a default minimum power charging Rp state, a device functioning as a power sink can consume a higher power charging level only when the device functioning as the power sink is in a USB configured stage. The USB Type-C specification also states that when a USB-C port which doesn't support the USB battery charging (BC) specification 1.2 of Oct. 12, 2011 shall advertise a USB Type-C current at the Default USB Power level.

Figure 2:
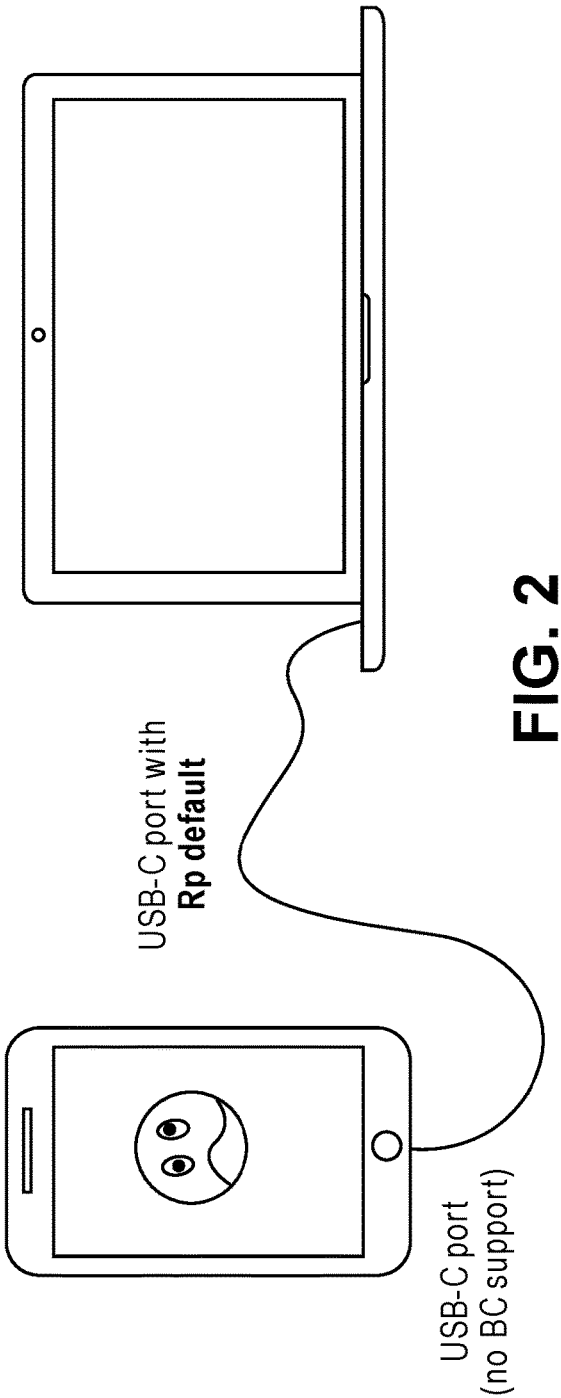
FIG. 2 is a diagram of a battery powered device like a mobile handset connected to a laptop.

According to the USB specifications 2.0 and 3.0 a USB device functioning as a power sink when connected to a standard downstream port will be able to consume only 100 mA before USB configuration and when in a USB unconnected and suspend state it can consume only 2.5 mA of current. In an end user scenario, a battery powered device like a mobile handset connected to a laptop as shown FIG. 2 will provide an unsatisfactory user experience. Using USB port of a computing device for data management and charging of a mobile computing device is a common scenario and convenient practice. When both these devices adopt USB-C it is more likely these devices will not integrate addition technologies like the USB BC specification for higher power charging with cost a factor in not supporting that standard. A problem then arises when a battery powered mobile computing device is running low in battery power or with a dead battery is connected to a USB-C port of a laptop or desktop computing device with presetting default resistance Rp. During this dead battery condition, the battery powered device cannot enter a connected state and hence it will be able consume only 2.5 mA of current, which is a very slow or nil charging condition that will lead to bad user experience.

Figure 3:
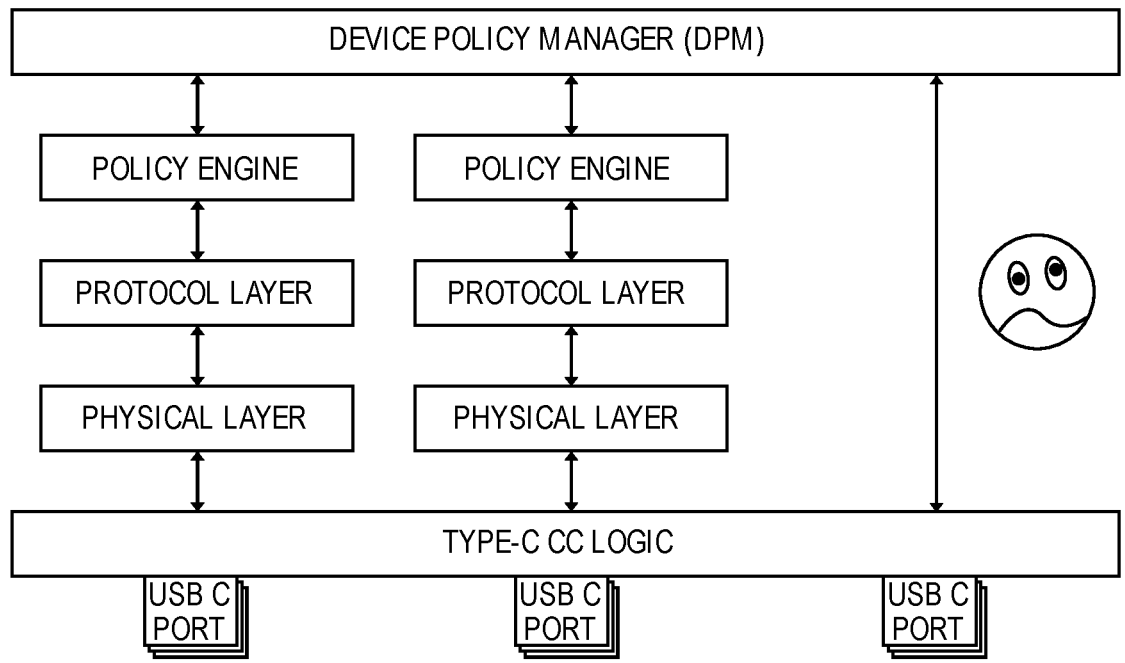
FIG. 3 is a diagram of the architecture of USB port management using a device policy manager (DPM).

FIG. 3 is a diagram of the architecture of USB port management using a device policy manager (DPM). The case illustrated in FIG. 3 is a multiport solution in which the USB PD ports have additional information about each of the USB ports through the protocol negotiations and the non-PD port has very limited information about the connected peer device. The DPM thus works with limited information and proper management is of this port is not possible. Though the source port may have additional power a device functioning as a sink attached to that port cannot consume additional current leading to inefficient power management scenario and the source port has no defined mechanism for handling a dead battery scenario.

The DPM of each device communicates with each port through the layers of the USB-C specification. The USB-PD specification defines a policy engine, protocol layer and physical layer. The physical layer encompasses the physical medium of communication between the port and the DPM as well as low level communication related to power delivery such as the configuration of resistance levels (e.g., Rp and Rd) on the physical medium. The protocol layer defines messaging between the port and the DPM that enables the DPM to negotiate allotted power levels for the devices attached to the port. The policy engine implements basic USB-PD management specific to the corresponding port.

The DPM controls the allotment and management of power across the available ports in the system. The DPM is the brains of the USB-C subsystem which handles management of the power role, power policy, multiple port monitoring and power requirements balancing across the available ports. The DPM monitors batteries and AC power supplies and manages alternate modes of operation. Thus, in a USB-C architecture, the DPM can manager connection/disconnection, power distribution or enabling functionalities and can be controlled and managed by a software module.

Another feature in the USB ecosystem is that the USB specifications define USB-C cables with integrated electronics to communicate cable capabilities and perform signal conditioning referred as "Active Cable" technology. These USB-C active cables can be of length greater (up to 50 m) than the standard length of 5 meters for prior types of USB cables. This presents many new possible data/video intensive technologies and applications beyond the PC centric technologies and applications. With such diverse capability of power, data and video along with standardized USB-C cables, USB-C technology will expand to new ecosystems which legacy USB did not support or enable. The embodiments support these new ecosystems which USB-C/USB PD technologies will expand into.

In a USB-C ecosystem, the connection and enumeration of a USB device is divided between the USB-C/USB PD subsystems and the USB functional subsystem. The USB-C subsystem is responsible for connect/disconnect and managing power. After successful connection and power negotiation the functional aspects of USB like enumeration and USB device functionality (e.g., data transfer) is started.

As discussed herein above, when a battery powered device implementing USB-C and functioning as a power since is in a dead battery condition and is connected to a USB-C (non-PD) source port advertising with default Rp and no USB BC 1.2 in the ecosystem, the device functioning as a power sink will be able to consume as low as 2.5 mA of current which doesn't allow the power sink to charge quickly and there is no method defined by the USB-C and specification to address this issue. This leads to inefficient usage of available power leading to bad user experience.

Overview

The embodiments extend a USB-C power source DPM with additional information about the connected devices, particularly of the battery condition to enable necessary current advertisement. The embodiments provide a functional block that detects dead battery condition of the device functioning as a power sink, where the functional block acts as a feedback mechanism to the DPM to enable the DPM to enhance the current advertisement for power charging to a higher current level. The embodiments also provide a device functioning as a power sink that emulates a USB connection to negotiate a higher current level at the DPM level when the battery of that device is dead. Thus, the embodiments provide a system and method that is advantageous when a device is in dead battery mode, when a battery powered device cannot recover due to low power availability in a non-PD port the embodiments enable the battery powered device to recover from the dead battery condition faster and also conserve the power resources and share the available power pool efficiently with the battery powered device. Table II shows the effect of the battery feedback mechanism of the embodiments.

TABLE II

| | With battery feedback | Without battery feedback |
| --- | --- | --- |
| Dead battery DPM at Source | >=1.5 A of current for fast charging Allows conserving system power and share power pool with other ports | 2.5 mA of current for charging |
| Dead battery DPM at Sink | 100 mA of current for fast charging | 2.5 mA of current for charging |

In a USB-C/USB PD ecosystem, the decision of the amount of power to be supplied to a USB-C Port is determined by the USB Type-C or/and by the USB PD subsystem. The USB Type-C subsystem is capable of providing up to 5/3A of power and has no defined methods to 'negotiate' power distribution with peers. When a system implements USB PD, a system can determine the power needs of connected USB peer devices through protocol negotiation. In the current ecosystems there is no definite method or path in these systems for the USB Type-C Device Policy Manager (DPM) to decide on the power distribution where there is a low or no power scenario.

When a DPM starts execution in a system with an Rp default current advertisement there is no logical way to subsequently determine and then change the initial Rp value. This lack of knowledge limits the DPM module from properly managing the available power in the system for USB-C only devices. As per the USB Type C specification, a system could dynamically change the Rp resistance levels, but without knowledge of the power requirements of attached devices, such as those with a low or dead battery, changing the advertised Rp doesn't improve operation.

Figure 4:
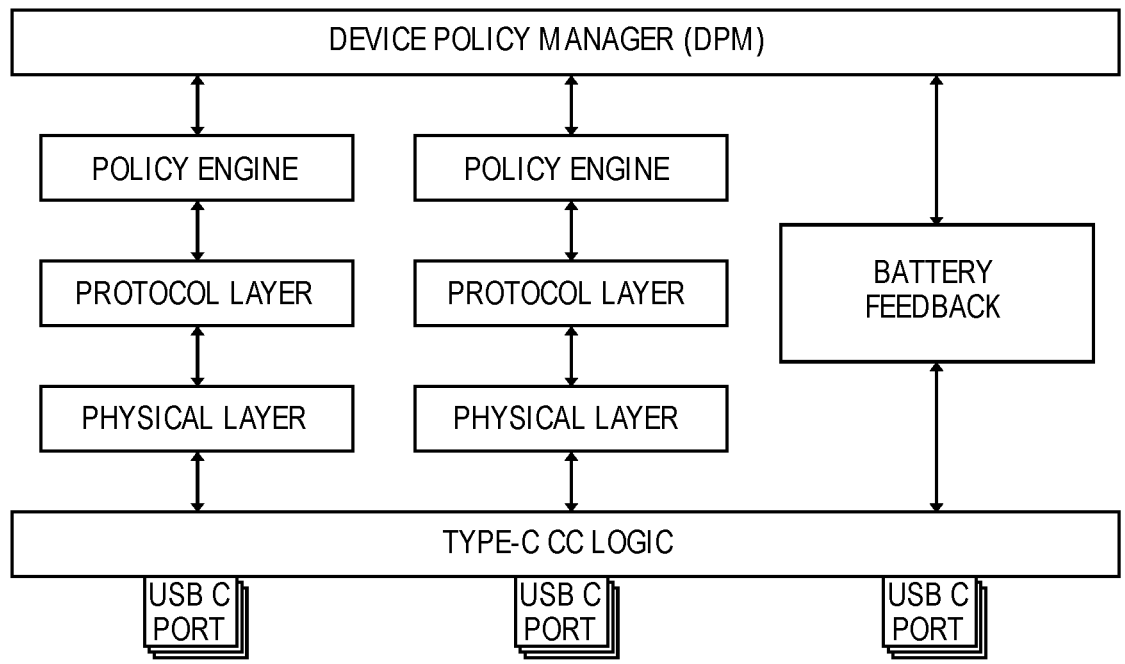
FIG. 4 is a diagram of one embodiment of a DPM with a battery feedback mechanism.

FIG. 4 is a diagram of one embodiment of a DPM with a battery feedback mechanism. The battery feedback mechanism 401 detects a dead or low battery of the peer device and indicates to the DPM to share more power from the available pool by changing the Rp to a higher Rp resistance than the Rp default and thereby signaling an increased current level is to be provided to the peer device. The battery feedback mechanism 401 for the DPM could be implemented using an analog to digital converter (ADC) that measures a power consumption pattern that the DPM can use to make a decision on the power capabilities of an attached USB peer.

As illustrated in FIG. 4, the battery feedback mechanism is a functional block that is connected to the CC signal line and the associated USB-C port. The battery feedback mechanism 401 detects analog signal conditions on the CC signal line to collect data about the connected USB device for the associated USB-C port. As illustrated, the battery feedback mechanism 401 can be utilized for ports that don't implement the USB PD specification or USB BC specification and thus do not have the policy engine, protocol layer, or physical layer implementations that the other ports in the illustrated example have and that negotiate with the attached USB devices for those respective ports.

Figure 5:
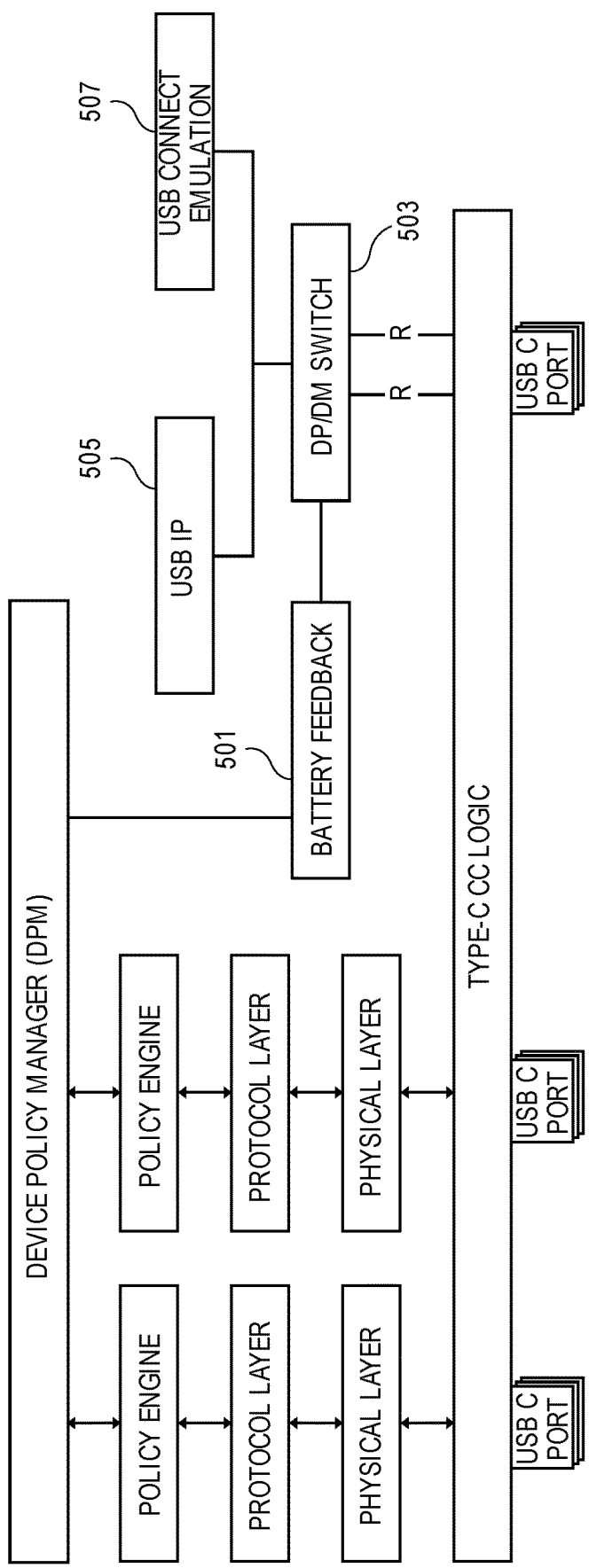
FIG. 5 is a diagram of another embodiment of a DPM with an alternate battery feedback mechanism.

FIG. 5 is a diagram of another embodiment of a DPM with an alternate battery feedback mechanism. In a similar scenario, a battery powered device that is functioning as a power sink will present Rd on a USB CC signal line when connected to become a power sink and consume power. With the connection with a USB host, the necessary power is available to bring up the external power management integrated circuit (PMIC), controllers managing CC and similar circuitry. But the current is minimal due to the unconnected USB state. The embodiment provides a mechanism for USB connection emulation where the device is not running. The embodiments enable negotiation with a connected USB host and power source by using the DP/DM (D+/D−) lines and the DP/DM switch 503 as illustrated in the FIG. 5. A USB device controller is generally used to manage the USB connection and negotiate the power level. However, where the USB device has insufficient power to run higher level software a USB connection emulation circuit 507 can be connected to the DP/DM switch 503 to manage negotiation by emulating the USB functions necessary to indicate support for higher level power charging. A battery feedback mechanism 501 detects low or dead battery conditions to enable the USB connection emulation by setting the DP/DM switch 503 to be driven by the USB connect emulation 507. In this way a device with a dead or low battery can be configured as a power sink and will be allowed to consume a higher current (e.g., greater than a current minimum of 100 mA) to charge up the battery faster and switch back to USB IP enumeration 505 for standard USB operation.

Figure 6A:
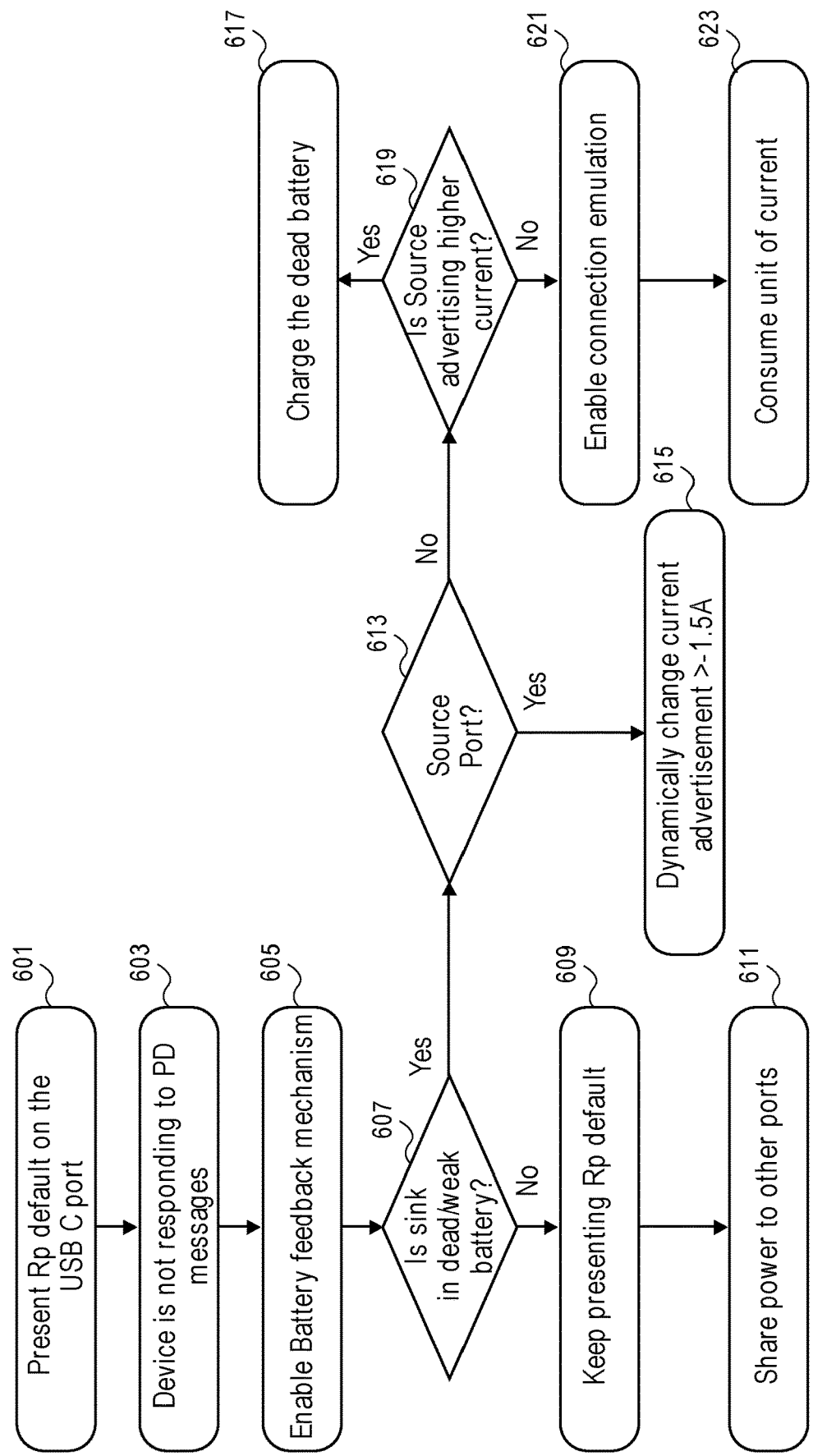
FIG. 6A is a flowchart of one embodiment of the operation of the process for USB power negotiation with a battery feedback mechanism.

FIG. 6A is a flowchart of one embodiment of the operation of the process for USB power negotiation with a battery feedback mechanism. In one embodiment, the process is implemented by the battery feedback mechanism, USB emulator, USB host executing the DPM or any combination thereof. The process is initiated at power on where the USB controller presents the default resistance Rp on a given USB-C port (Block 601). The USB controller implementing the DPM initiates sending PD related messages to determine support for USB PD, but receives no response from the connected device (Block 603). This may be determined with a timeout or similar mechanism for determining a failed response. The process then enables the battery feedback mechanism (Block 605).

The battery feedback mechanism determines whether either of the connected devices is functioning as a power sink and in a dead or weak battery state (Block 607). The determination can be based on the power level of the implementing device battery, connected device power level on the VBUS or where the battery feedback mechanism or USB emulator of the connected devices signal that one is a power sink and has a dead or low battery state. Where neither device is operating as a power sink in a low or dead battery state, then the implementing device DPM can continue to advertise the default resistance Rp on the USB connection (Block 609). The DPM can then determine to share the available power to other USB ports (Block 611).

Where one of the connected devices is operating as a power sink, then the implementing device determines whether its port is operating as the power source (Block 613). If the USB-C port of the implementing device is operating as the power source, then the DPM can dynamically change the current advertised to a higher level than the minimum (e.g., to a current level of greater than 1.5 A). If the USB-C port of the implementing device is not the source port, then the process determines what the source port is advertising with the resistance RP (i.e., a low or high current) (Block 619). If the source port is advertising a high current, then the process begins charging the battery with the high current being advertised by the source port. If the source port is not advertising a high current (i.e., it is advertising the minimum resistance Rp), then the DPM or battery feedback mechanism enables the USB connection emulation (Block 621). The USB connection emulation enables the implementing device to be in a low or dead battery state, but signals the source port to establish a USB connection to enable the negotiation of a higher current level for battery charging (Block 623). Once the higher current level has been established, then the USB connection emulation can complete and the standard USB/IP port operation can commence.

Figure 6B:
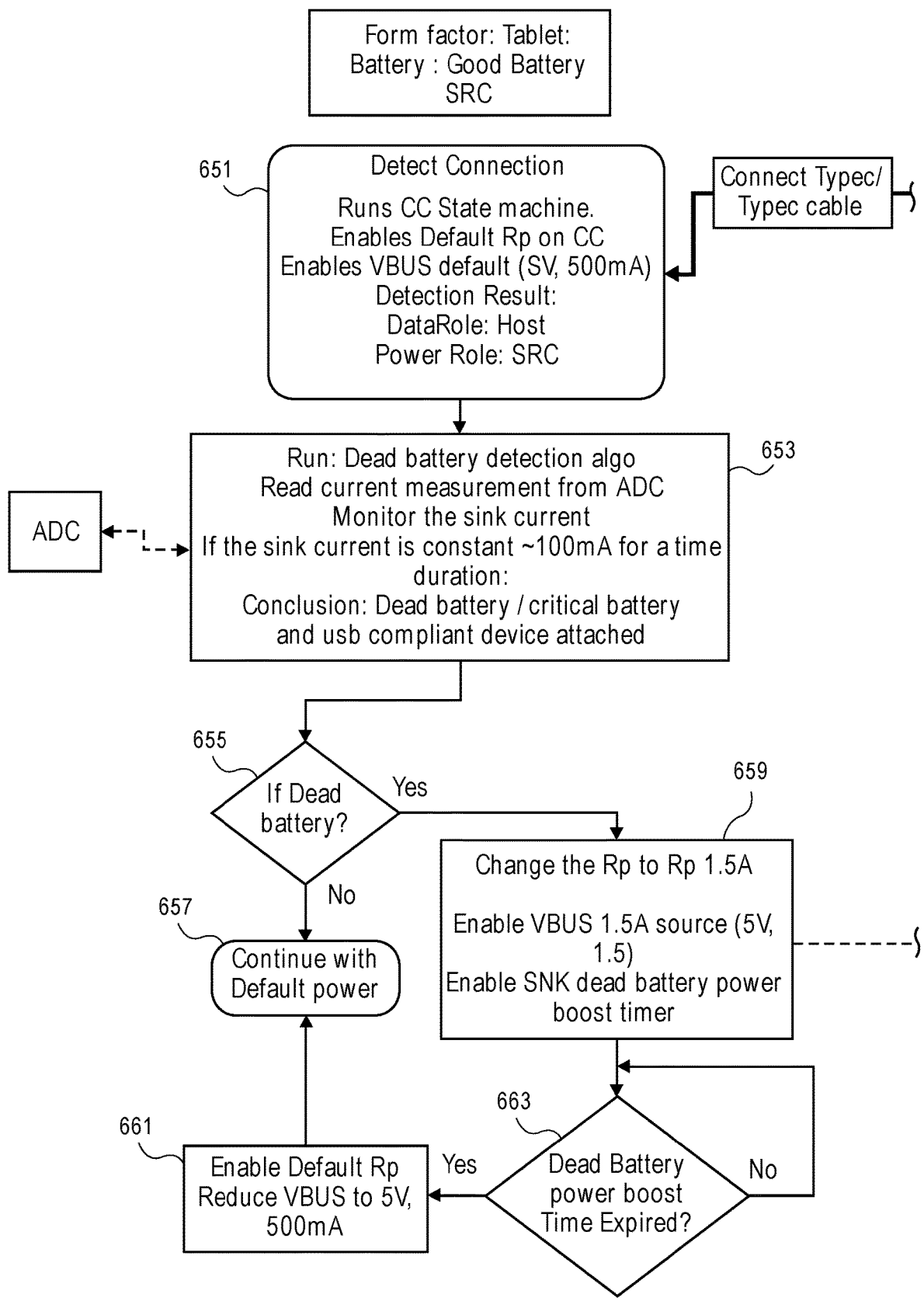
FIG. 6B is a flowchart of one embodiment of a process for detecting current on a USB connection to detect and dynamically change resistance Rp.
Figure 6C:
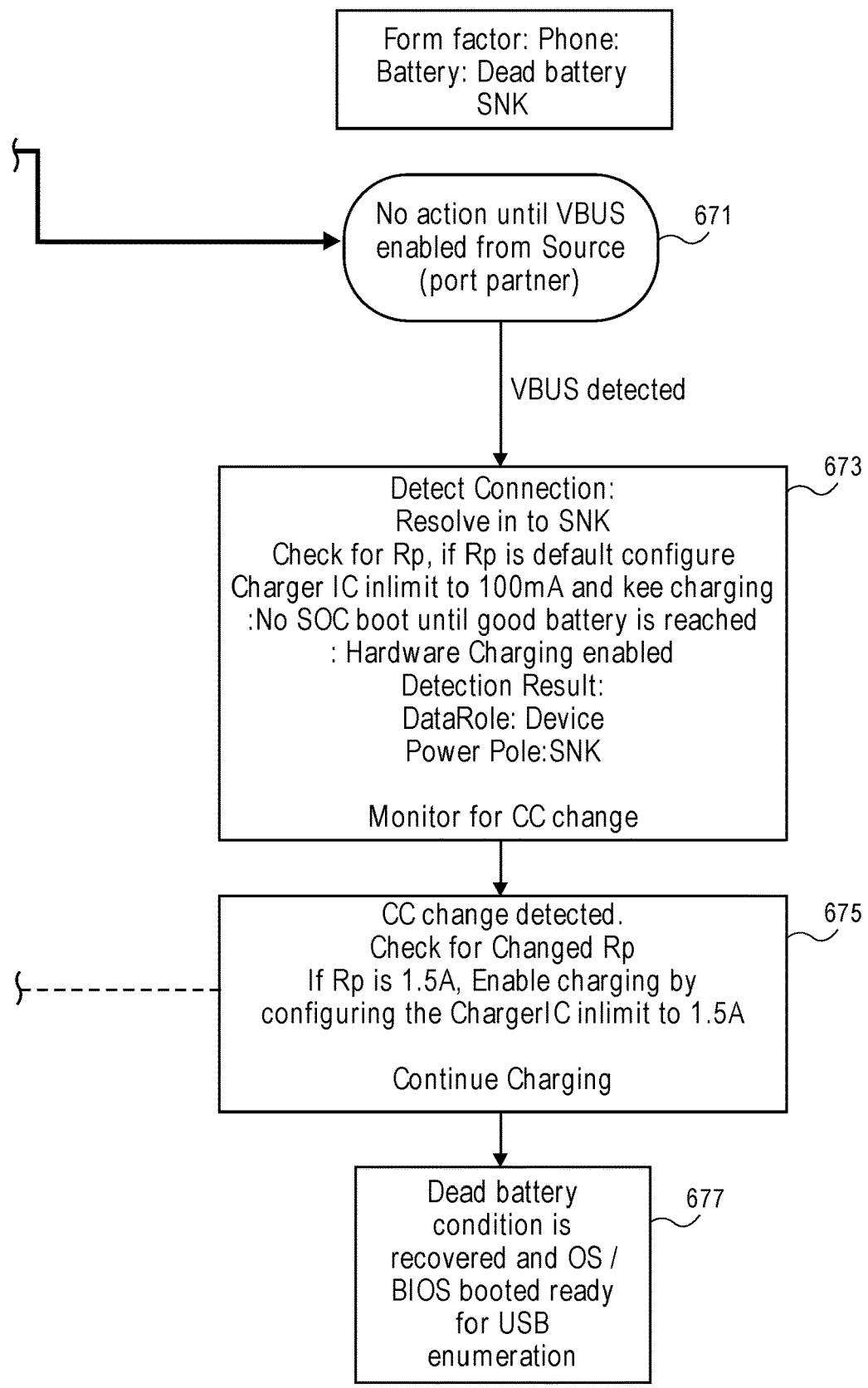
FIG. 6C is a continuation flowchart of FIG. 6B.

FIGS. 6B and 6C present a flowchart of one embodiment of a process for detecting current on a USB connection to detect and dynamically change resistance Rp. In this example embodiment, two devices are connected over a USB-C port and USB-C cable. The first device on the left side in this example is a tablet with a battery with a good charge (e.g., greater than 50%) that will function as a power source. The second device on the right side in this example is a phone with a dead battery that will function as a power sink.

In the first example stage, the first device detects a connection on a USB-C port (Block 651). The first device runs the CC signal line state machine, enables a default resistance Rp on the CC signal line, enables the VBUS with the default power (i.e., 5 v at 500 mA) and determines that it is the USB host (i.e., for its data role) and the power source. The detection of the data role and power role is based on the CC state machine, battery feedback mechanism and DPM. The first stage on the second device does not involve any action (Block 671), since the device is not operational due to the low or dead battery. The USB controller can begin to function in response to the presentation of the power on the VBUS from the source device (i.e., the first device).

In the second stage, the first device enables the battery feedback mechanism to determine whether the connected device has a dead or low battery (Block 653). This enablement of the battery feedback mechanism may be in response to a failure of the second device to respond to USB PD messages or similar actions of the first device on the USB connection. The battery feedback mechanism can utilize an ADC to monitor current from the sink device (i.e., the second device) on the VBUS. If the sink current draw is constant (e.g., approx. 100 mA) for a specified time duration, then the battery feedback mechanism can determine that there is an attached device that is in a low or dead battery state. In the second device in the second stage, after detecting the VBUS voltage the USB controller at the second device can begin to function and resolves that its data role is USB device and its power role is a sink. The second device detects the present resistance Rp on the CC signal line and configured its PMIC to draw the 100 mA and to continue charging the battery (Block 673). The second device is still unable to boot (e.g., not able to perform a system on a chip (SOC) boot) until the battery reaches a threshold level. The hardware charging is enabled and the CC signal line is monitored for any changes.

In the third stage, the first device determines whether the attached USB peer is in a low or dead battery state (Block 655) and if this is not the case continues with its current power settings (Block 657). However, if the attached peer USB device is in a low or dead battery state, then the first device changes the advertised resistance Rp to indicate a power level of 1.5 A or higher and enables the VBUS to carry the 1.5 A at 5V (Block 659). In some embodiments, a dead battery boost timer is enabled that keeps the elevated charge level for a specified time period (e.g., 15 minutes or less than the allowed recovery limit of 45 minutes). Generally, it is expected that a peer USB device is able to recover within 15 minutes of elevated power charging with 1.5 A of power consumption based on empirical data. When the boost time has elapsed (Block 663), then the first device returns the power levels to default values (e.g., default Rp, 5V and 500 mA) (Block 661). In the third stage, the second device detects the change in the advertised resistance Rp to be greater than a default Rp and configures its charging to match the available power current (e.g., 1.5 A) and continues to charge (Block 675). The second device monitors for recovery from the dead battery condition and can initiate an operating system, basic input/output system (BIOS), and USB enumeration for continued normal operation with an established USB connection.

Thus, the embodiment provides a system, process and mechanism that can determine proper power allotment by monitoring the dynamic Rp change and the connection method during dead battery scenario. There are other scenarios where a power consuming device like a USB power table lamp can be connected in the ecosystem described. These devices use just a USB connector without any controller. This means these devices cannot send PD packets. In such cases the embodiments can support such devices and detect a non-dead battery scenario and present lowest Rp(default) to preserve the battery and facilitate operation of other ports.

FIGS. 7-10 discuss embodiments of receptacles and plugs to connect one device to another device. Table III that follows depicts embodiments of channels (e.g., conductors) to allow signals to flow between multiple devices.

TABLE III

Example Communication Channels

| Pin | Signal Name | Description | Mating Sequence | Pin | Signal Name | Description | Mating Sequence |
|-----|-------------|-------------|-----------------|-----|-------------|-------------|-----------------|
| A1 | GND | Ground return | First | B12 | GND | Ground return | First |
| A2 | SSTXp1 | Positive half of first (e.g., SuperSpeed) transmitter (TX) differential pair of a first type | Second | B11 | SSRXp1 | Positive half of first (e.g., SuperSpeed) receiver (RX) differential pair of the first type | Second |
| A3 | SSTXn1 | Negative half of first (e.g., SuperSpeed) TX differential pair of the first type | Second | B10 | SSRXn1 | Negative half of first (e.g., SuperSpeed) RX differential pair of the first type | Second |
| A4 | VBUS | Bus Power | First | B9 | VBUS | Bus Power | First |
| A5 | CC1 | Configuration Channel | Second | B8 | SBU2 | Sideband Use (SBU) | Second |
| A6 | Dp1 | Positive half of a second type (e.g., USB 2.0) of differential pair - Position 1 | Second | B7 | Dn2 | Negative half of the second type (e.g., USB 2.0) of differential pair - Position 2 | Second |
| A7 | Dn1 | Negative half of the second type (e.g., USB 2.0) of differential pair - Position 1 | Second | B6 | Dp2 | Positive half of the second type (e.g., USB 2.0) of differential pair - Position 2 | Second |
| A8 | SBU1 | Sideband Use (SBU) | Second | B5 | CC2 | Configuration Channel | Second |
| A9 | VBUS | Bus Power | First | B4 | VBUS | Bus Power | First |
| A10 | SSRXn2 | Negative half of second (e.g., SuperSpeed) RX differential pair of the first type | Second | B3 | SSTXn2 | Negative half of second (e.g., SuperSpeed) TX differential pair of the first type | Second |

TABLE III-continued

Example Communication Channels

| Pin | Signal Name | Description | Mating Sequence | Pin | Signal Name | Description | Mating Sequence |
|---|---|---|---|---|---|---|---|
| A11 | SSRXp2 | Positive half of second (e.g., SuperSpeed) RX differential pair of the first type | Second | B2 | SSTXp2 | Positive half of second (e.g., SuperSpeed) TX differential pair of the first type | Second |
| A12 | GND | Ground return | First | B1 | GND | Ground return | First |

Figures 7, 8:
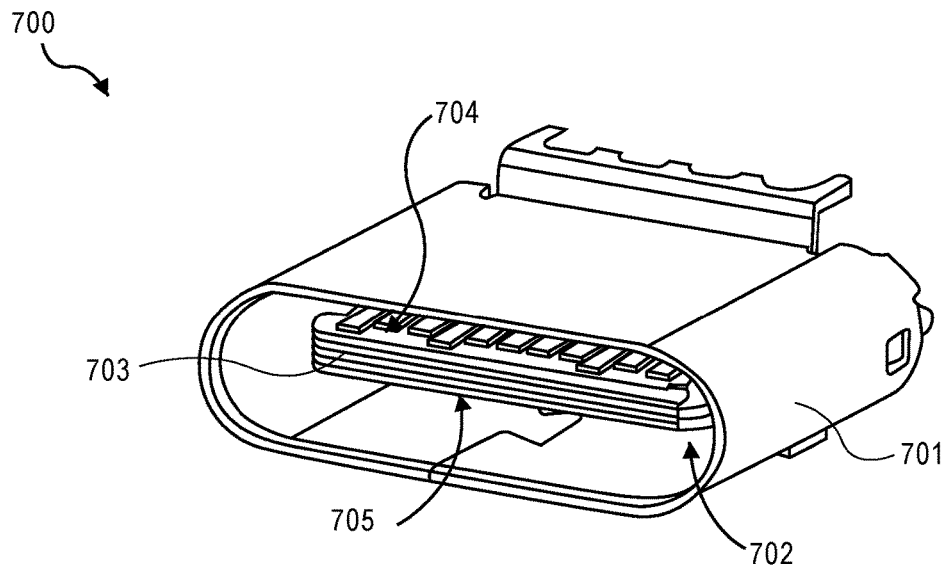
FIG. 7 illustrates a perspective view of a serial bus receptacle.
FIG. 8 illustrates a schematic diagram of the pins of a serial bus.

FIG. 7 illustrates a perspective view of a serial bus receptacle 700 according to embodiments of the disclosure. In certain embodiments, serial bus receptacle 700 may be part of (e.g., within) a device (e.g., mounted to a circuit board of a device).

FIG. 8 illustrates a schematic diagram 800 of the pins of a serial bus receptacle (e.g., serial bus receptacle 700) according to embodiments of the disclosure.

Figure 9:
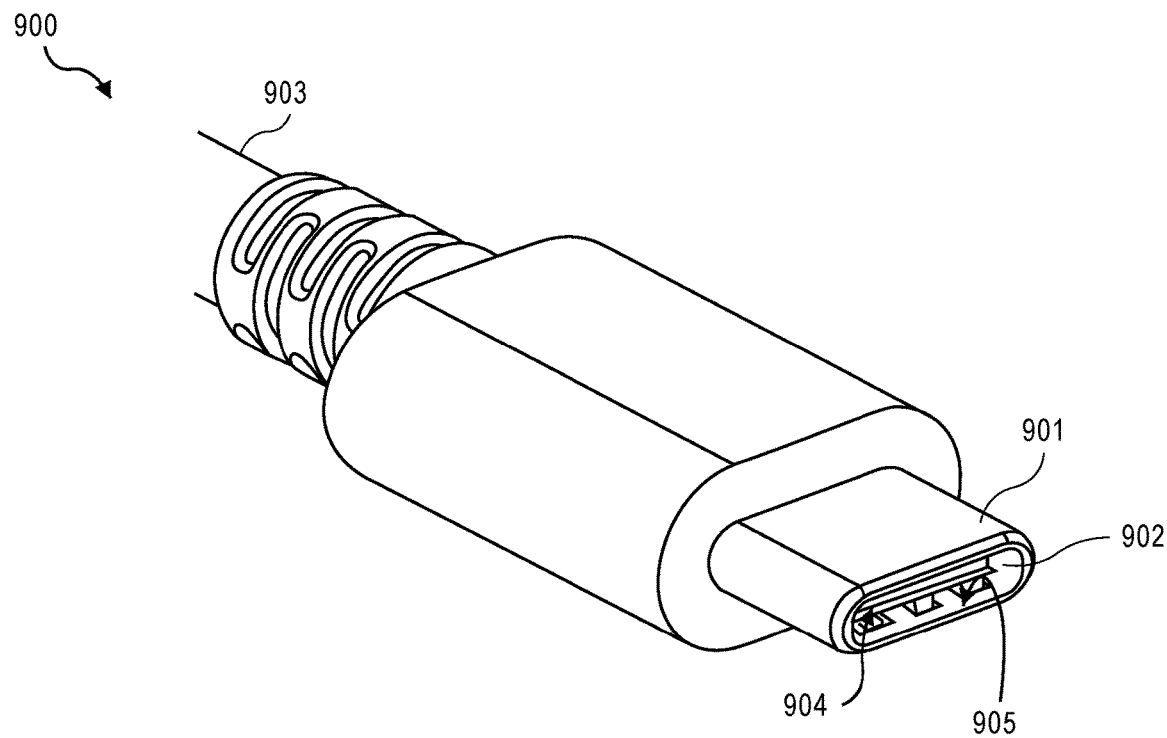
FIG. 9 illustrates a perspective view of a serial bus plug.

FIG. 9 illustrates a perspective view of a serial bus plug 900 according to embodiments of the disclosure. In certain embodiments, serial bus plug may connect (e.g., physically and electrically) to a serial bus receptacle (e.g., serial bus receptacle 900).

Figure 10:
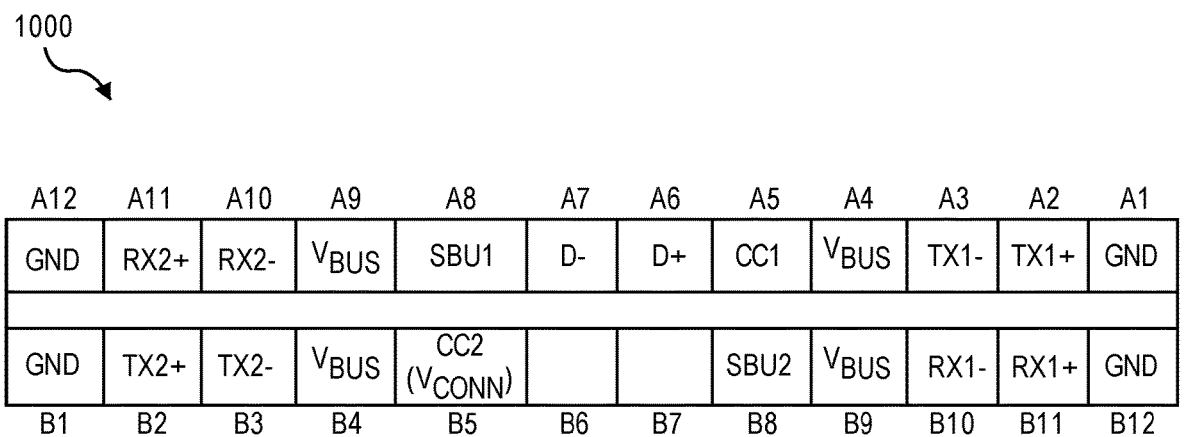
FIG. 10 illustrates a schematic diagram of the pins of a serial bus plug.

FIG. 10 illustrates a schematic diagram 1000 of the pins of a serial bus plug (e.g., serial bus plug 900) according to embodiments of the disclosure.

In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position. In certain embodiments, a serial bus plug is flip-able between a right-side up position and an upside-down position (relative to the receptacle it is to be inserted into). In certain embodiments, (e.g., serial bus) plug 900 of FIG. 9 slides within (e.g., serial bus) receptacle 700 of FIG. 7, e.g., the housing 901 slides within the shell 701 (e.g., enclosure). Tongue 902 may be (e.g., fixedly) disposed within the bore of the shell 701 of the serial bus receptacle. Depicted tongue 902 includes a first (e.g., substantially planar) side 904 and an opposing second (e.g., substantially planar) side 905. In one embodiment, first side 904 is (e.g., substantially) parallel to the second side 905. One or both of first side 904 and second side 905 may include electrical contacts (e.g., pins, pads, springs, etc.) thereon, e.g., facing in opposing directions. A longitudinal axis of each electrical contact may extend from the rear of shell 901 towards the opening at the front of shell 901, for example, along the first side 904 and/or the second side 905. A leading edge 903 of the tongue 902 may be (e.g., substantially) perpendicular to the first side 904 and the second side 905. The body of the tongue 902, e.g., excluding any electrical contacts thereon, may be a non-conductive material, for example, glass-filled nylon. The leading edge 903 of the tongue 902 may not include any electrical contacts to mate with the electrical (for example, signal and/or data, e.g., but not ground) contacts of a plug. The back wall of the receptacle may not include any electrical contacts to mate with the electrical (for example, signal and/or data, e.g., but not ground) contacts of a plug. First side 904 may include (e.g., only) a first row of electrical contacts thereon, for example, the electrical contacts (e.g., pins) in FIG. 10, e.g., pins A1-A12. Second side 905 may include (e.g., only) a second row of electrical contacts thereon, for example, the electrical contacts (e.g., pins) in FIG. 10, e.g., pins B12-B1. Electrical contacts may physically connect (e.g., fixedly connect) to the circuitry of a device, e.g., a multiple role togging circuit or other circuitry discussed herein.

Turning again to FIG. 9, in certain embodiments, the serial bus plug 900 includes a housing 901 with a bore therein, e.g., having an opening at the front of the housing 901 and a back wall opposite of the opening. Housing 901 may include electrical contacts in the bore thereof. A first side 904 of the interior of the housing may be (e.g., substantially) parallel to a second side 905 of the interior of the housing of the serial bus plug 900. One or both of first side 904 and second side 905 may include electrical contacts (e.g., pins, pads, springs, etc.) thereon, e.g., facing each other. Contacts on the first side 904 and/or the second side 905 may couple (e.g., physically and electrically connect) to the first side 704 and/or the second side 705 of receptacle 700. In one embodiment, a first side 904 of plug 900 couples with either of the first side 704 and the second side 705 of the receptacle 700 and the second side 905 of the plug 900 couples with the other of the first side 704 and the second side 705 of the receptacle 700 (e.g., flip-able). A longitudinal axis of each electrical contact may extend from the rear of housing 901 towards the opening 902 at the front of housing 901, for example, along the first side 904 and/or the second side 905. Housing 901 may be slideably received within an (e.g., continuous) annulus formed between the exterior surface of the tongue 702 and an interior surface of the shell 701 of the receptacle 700. The leading edge of the housing 901 not include any electrical contacts to mate with the electrical (for example, signal and/or data, e.g., but not ground) contacts of a receptacle. The back wall of the housing 901 may not include any electrical contacts to mate with the electrical (for example, signal and/or data, e.g., but not ground) contacts of a receptacle. First side 904 may include (e.g., only) a first row of electrical contacts thereon, for example, the electrical contacts (e.g., pins) in FIG. 10, e.g., pins A12-A1. Second side 905 may include (e.g., only) a second row of electrical contacts thereon, for example, the electrical contacts (e.g., pins) in FIG. 10, e.g., pins B1-B12. Electrical contacts may physically connect (e.g., fixedly connect) to a cable 903 or other electrical conductors (for example, wires to a memory device, e.g., a USB memory stick). Cable 903 may connect to another plug, e.g., to connect to a receptacle that physically connects to the circuitry of a device, e.g., a multiple role togging circuit or other circuitry discussed herein.

Circuitry here may include a transmitter and/or a receiver to send and receive data, respectively, e.g., as part of a transceiver (e.g., a physical layer (PHY) circuit).

Figure 11:
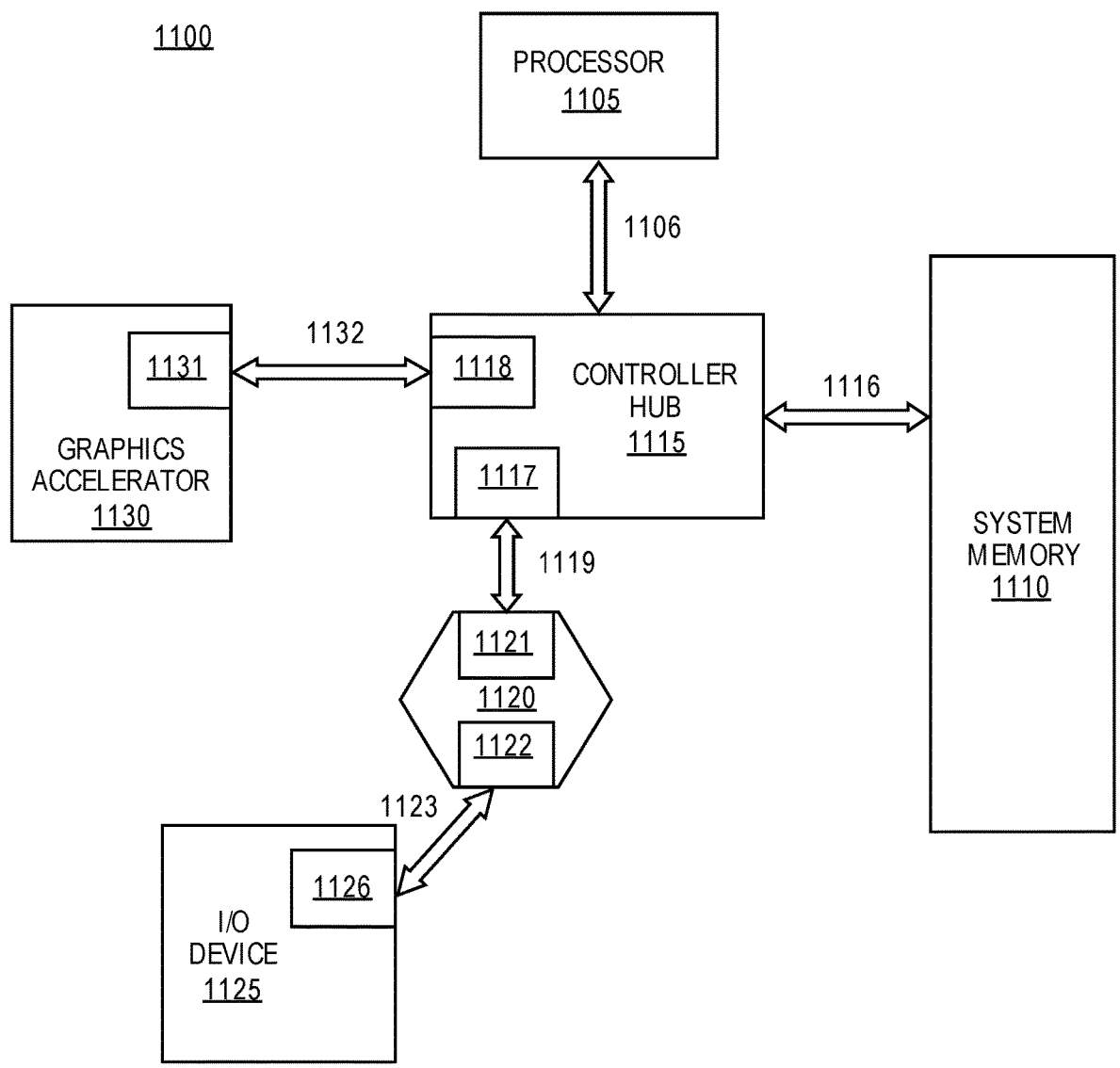
FIG. 11 illustrates a computing system including a peripheral component interconnect express (PCIe) compliant architecture according to embodiments of the disclosure.

Referring to FIG. 11, an embodiment of a fabric composed of point-to-point Links that interconnect a set of components is illustrated. System 1100 includes processor 1105 and system memory 1110 coupled to controller hub 1115. Processor 1105 includes any processing element, such as a microprocessor, a host processor, an embedded processor, a co-processor, or other processor. Processor 1105 is coupled to controller hub 1115 through front-side bus (FSB) 1106. In one embodiment, FSB 1106 is a serial point-to-point interconnect as described below. In another embodiment, link 1106 includes a serial, differential interconnect architecture that is compliant with different interconnect standard.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a Peripheral Component Interconnect Express (PCIe or PCIE) interconnection hierarchy. Examples of controller hub 1115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, e.g., up a hierarchy towards a root complex, to controller hub 1115 and downstream, e.g., down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132. In one embodiment, graphics accelerator 1130 is coupled to an MCH, which is coupled to an ICH. Switch 1120, and accordingly to I/O device 1125 through serial link 1123, is then coupled to the ICH. I/O modules 1131 and 1118 are also to implement a layered protocol stack to communicate between graphics accelerator 1130 and controller hub 1115. Similar to the MCH discussion above, a graphics controller or the graphics accelerator 1130 itself may be integrated in processor 1105. The embodiments described above can incorporate elements executed by the processor 1105 and involving the controller hub 1115 and other components such as the I/O device 1125.

Figure 12:
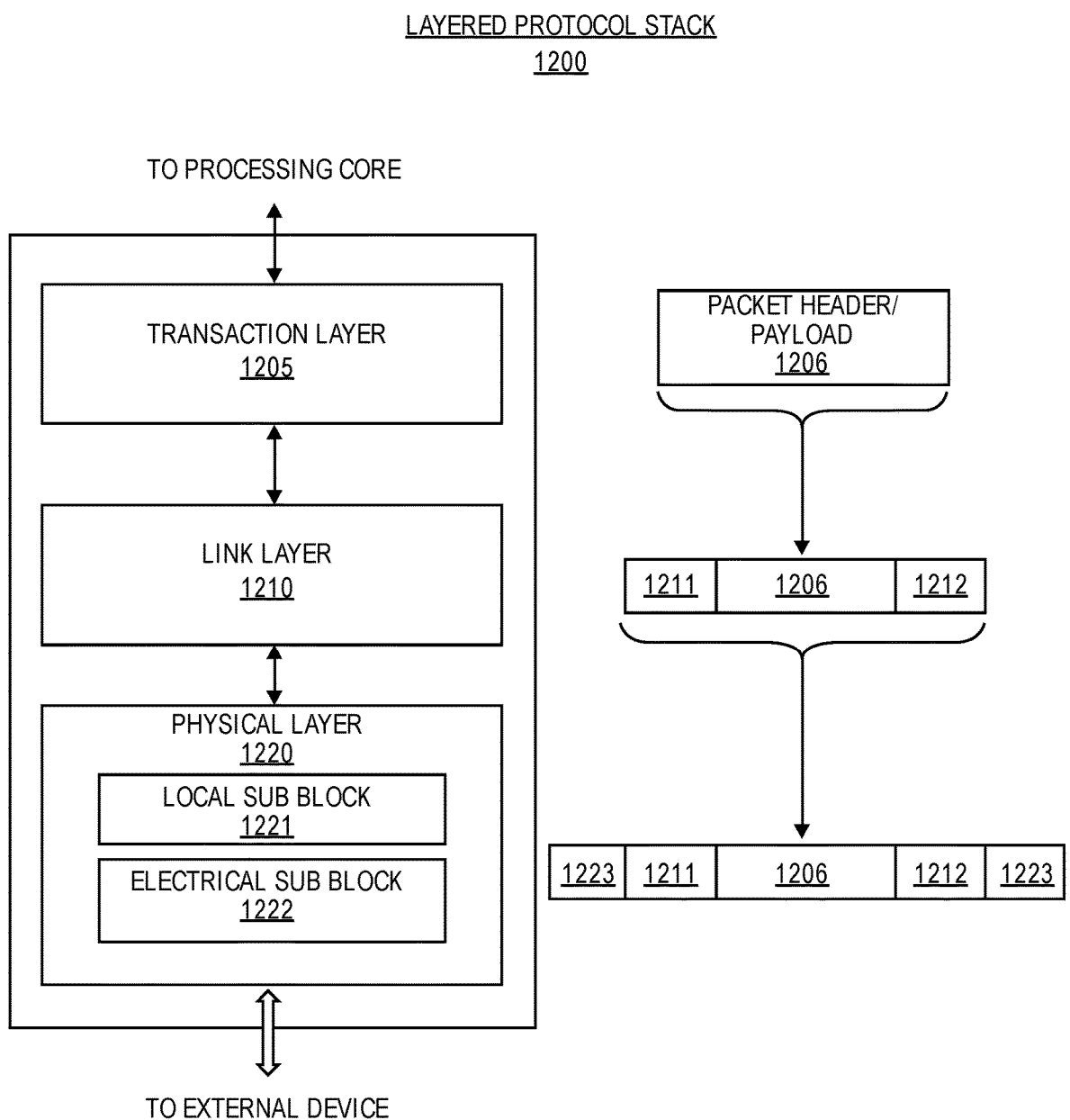
FIG. 12 illustrates a PCIe compliant interconnect architecture including a layered stack according to embodiments of the disclosure.

Turning to FIG. 12 an embodiment of a layered protocol stack is illustrated. Layered protocol stack 1200 includes any form of a layered communication stack, such as a Quick Path Interconnect (QPI) stack, a PCIe stack, a next generation high performance computing interconnect stack, or other layered stack. Although the discussion immediately below in reference to FIGS. 10-13 are in relation to a PCIe stack, the same concepts may be applied to other interconnect stacks. In one embodiment, protocol stack 1200 is a PCIe protocol stack including transaction layer 1205, link layer 1210, and physical layer 1220. An interface, such as interfaces 1117, 1118, 1121, 1122, 1126, and 1131 in FIG. 11, may be represented as communication protocol stack 1200. Representation as a communication protocol stack may also be referred to as a module or interface implementing/including a protocol stack.

PCI Express uses packets to communicate information between components. Packets are formed in the Transaction Layer 1205 and Data Link Layer 1210 to carry the information from the transmitting component to the receiving component. As the transmitted packets flow through the other layers, they are extended with additional information necessary to handle packets at those layers. At the receiving side the reverse process occurs and packets get transformed from their Physical Layer 1220 representation to the Data Link Layer 1210 representation and finally (for Transaction Layer Packets) to the form that can be processed by the Transaction Layer 1205 of the receiving device.

Transaction Layer

In one embodiment, transaction layer 1205 is to provide an interface between a device's processing core and the interconnect architecture, such as data link layer 1210 and physical layer 1220. In this regard, a primary responsibility of the transaction layer 1205 is the assembly and disassembly of packets (e.g., transaction layer packets, or TLPs). The translation layer 1205 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 1205. An external device at the opposite end of the link, such as controller hub 1115 in FIG. 11, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1205 assembles packet header/payload 1206. Format for current packet headers/payloads may be found in the PCIe specification at the PCIe specification website.

Figure 13:
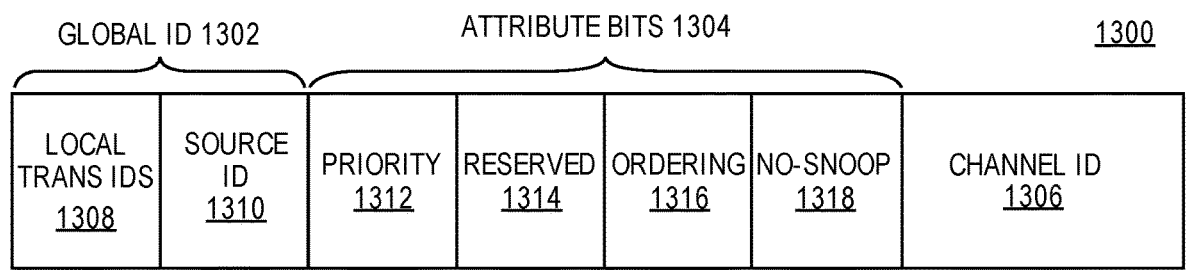
FIG. 13 illustrates a PCIe compliant request or packet to be generated or received within an interconnect architecture according to embodiments of the disclosure.

Referring to FIG. 13, an embodiment of a PCIe transaction descriptor is illustrated. In one embodiment, transaction descriptor 1300 is a mechanism for carrying transaction information. In this regard, transaction descriptor 1300 supports identification of transactions in a system. Other potential uses include tracking modifications of default transaction ordering and association of transaction with channels.

Transaction descriptor 1300 includes global identifier field 1302, attributes field 1304 and channel identifier field 1306. In the illustrated example, global identifier field 1302 is depicted comprising local transaction identifier field 1208 and source identifier field 1210. In one embodiment, global transaction identifier 1302 is unique for all outstanding requests.

According to one implementation, local transaction identifier field 1308 is a field generated by a requesting agent, and it is unique for all outstanding requests that require a completion for that requesting agent. Furthermore, in this example, source identifier 1310 uniquely identifies the requestor agent within a PCIe hierarchy. Accordingly, together with source ID 1310, local transaction identifier 1308 field provides global identification of a transaction within a hierarchy domain.

Attributes field 1304 specifies characteristics and relationships of the transaction. In this regard, attributes field 1304 is potentially used to provide additional information that allows modification of the default handling of transactions. In one embodiment, attributes field 1304 includes priority field 1312, reserved field 1314, ordering field 1316, and no-snoop field 1318. Here, priority sub-field 1312 may be modified by an initiator to assign a priority to the transaction. Reserved attribute field 1314 is left reserved for future, or vendor-defined usage. Possible usage models using priority or security attributes may be implemented using the reserved attribute field.

In this example, ordering attribute field 1316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1318 is utilized to determine if transactions are snooped. As shown, channel ID Field 1306 identifies a channel that a transaction is associated with.

Link Layer

Link layer 1210, also referred to as data link layer 1210, acts as an intermediate stage between transaction layer 1205 and the physical layer 1220. In one embodiment, a responsibility of the data link layer 1210 is providing a reliable mechanism for exchanging Transaction Layer Packets (TLPs) between two components a link. One side of the Data Link Layer 1210 accepts TLPs assembled by the Transaction Layer 1205, applies packet sequence identifier 1211, e.g., an identification number or packet number, calculates and applies an error detection code, e.g., CRC 1212, and submits the modified TLPs to the Physical Layer 1220 for transmission across a physical to an external device.

Physical Layer

In one embodiment, physical layer 1220 includes logical sub block 1221 and electrical sub-block 1222 to physically transmit a packet to an external device. Here, logical sub-block 1221 is responsible for the "digital" functions of Physical Layer 1221. In this regard, the logical sub-block includes a transmit section to prepare outgoing information for transmission by physical sub-block 1222, and a receiver section to identify and prepare received information before passing it to the Link Layer 1210.

Physical block 1222 includes a transmitter and a receiver. The transmitter is supplied by logical sub-block 1221 with symbols, which the transmitter serializes and transmits onto to an external device. The receiver is supplied with serialized symbols from an external device and transforms the received signals into a bit-stream. The bit-stream is de-serialized and supplied to logical sub-block 1221. In one embodiment, an 8b/10b transmission code is employed, where ten-bit symbols are transmitted/received. Here, special symbols are used to frame a packet with frames 1223. In addition, in one example, the receiver also provides a symbol clock recovered from the incoming serial stream.

As stated above, although transaction layer 1205, link layer 1210, and physical layer 1220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 14:
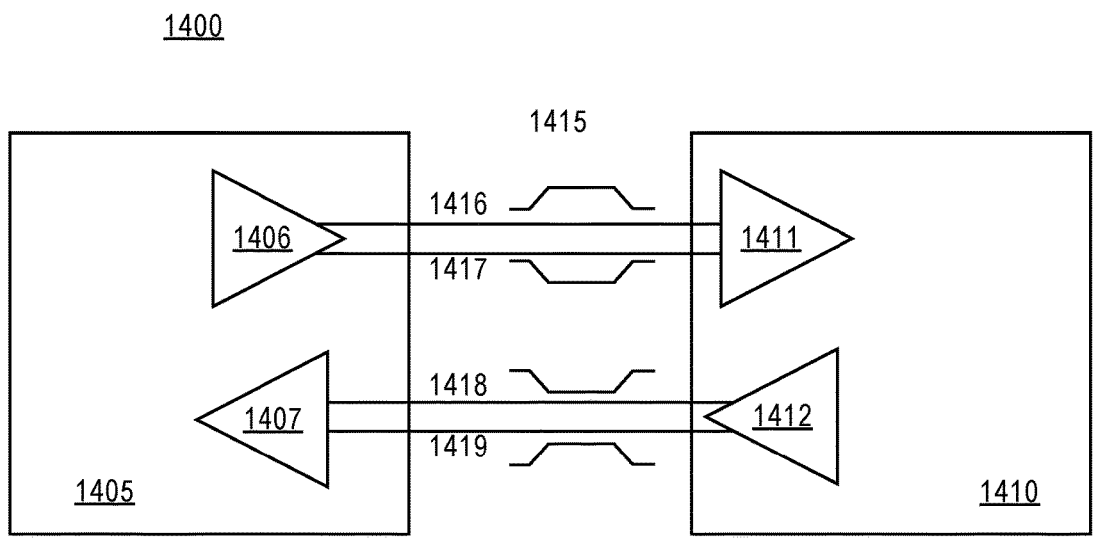
FIG. 14 illustrates a transmitter and receiver pair for a PCIe compliant interconnect architecture according to embodiments of the disclosure.

Referring next to FIG. 14, an embodiment of a PCIe serial point to point fabric 1400 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1406/1411 and a receive pair 1412/1407. Accordingly, device 1405 includes transmission logic 1406 to transmit data to device 1410 and receiving logic 1407 to receive data from device 1410. In other words, two transmitting paths, e.g., paths 1416 and 1417, and two receiving paths, e.g., paths 1418 and 1419, are included in a PCIe link.

A transmission path refers to any path for transmitting data, such as a transmission line, a copper line, an optical line, a wireless communication channel, an infrared communication link, or other communication path. A connection between two devices, such as device 1405 and device 1410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1416 and 1417, to transmit differential signals. As an example, when line 1416 toggles from a low voltage level to a high voltage level, e.g., a rising edge, line 1417 drives from a high voltage level to a low logic level, e.g., a falling edge. Differential signals potentially demonstrate better electrical characteristics, such as better signal integrity, e.g., crosscoupling, voltage overshoot/undershoot, ringing, etc. This allows for better timing window, which enables faster transmission frequencies.

Figure 15:
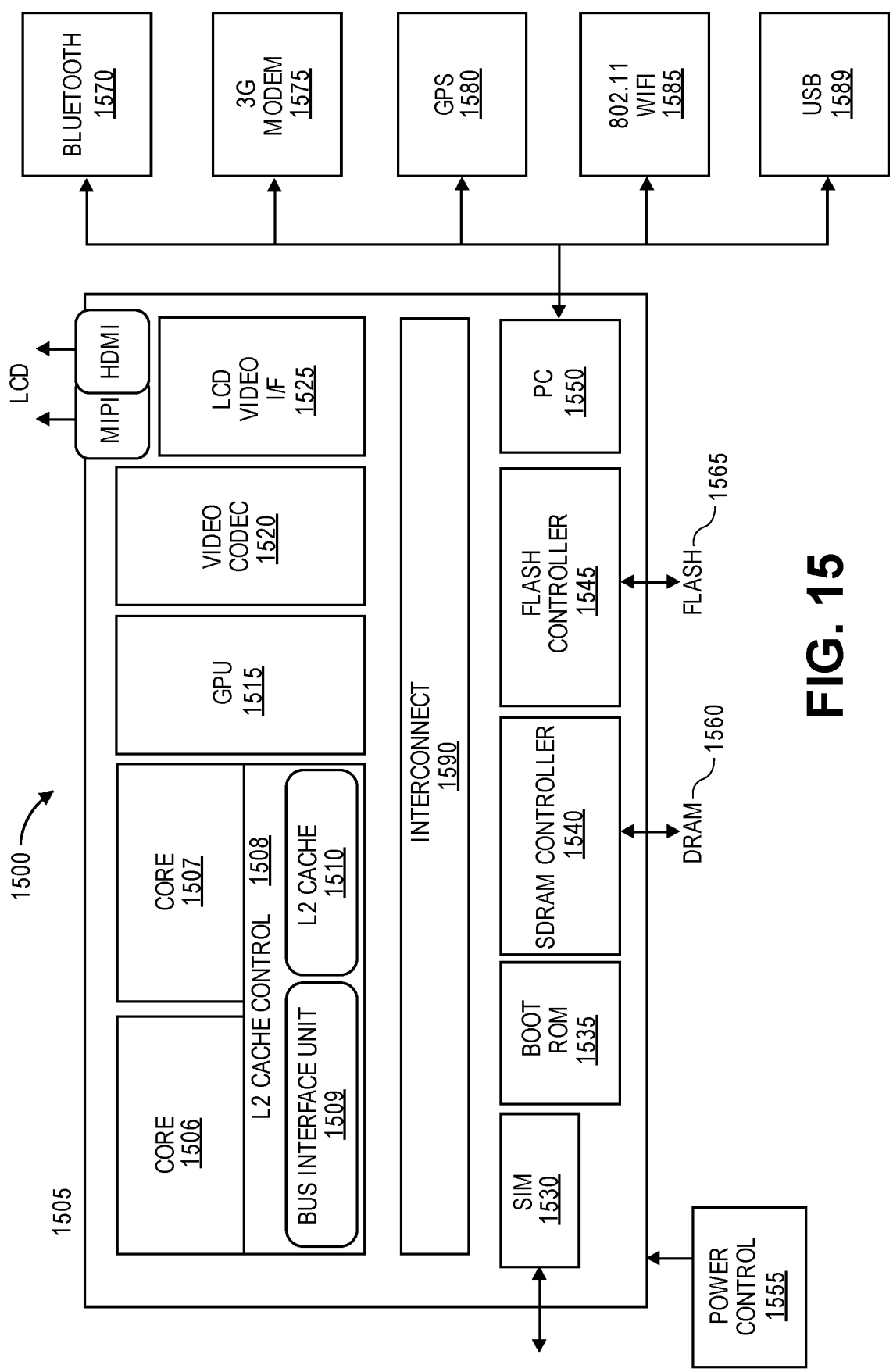
FIG. 15 illustrates a computing system on a chip according to embodiments of the disclosure.

Turning next to FIG. 15, an embodiment of a system on-chip (SOC) design in accordance with the embodiments is depicted. As a specific illustrative example, SOC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores-1506 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1590 includes an on-chip interconnect, such as an IOSF, AMBA, or other interconnect discussed above, which potentially implements one or more aspects of the described embodiments.

Interconnect 1590 provides communication channels to the other components, such as a Subscriber Identity Module (SIM) 1530 to interface with a SIM card, a boot ROM 1535 to hold boot code for execution by cores 1506 and 1507 to initialize and boot SOC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and WiFi 1585. The embodiments may establish the USB ecosystem via the WiFi 1585 and the battery feedback mechanism can be implemented in the SOC 1500 and USB port 1589. The USB port 1589 can be managed by an integrated input/output controller such as the peripheral controller 1550. The integrated input/output controller can implement any aspect of the USB host or USB device and any aspect of the embodiments described herein above. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 16:
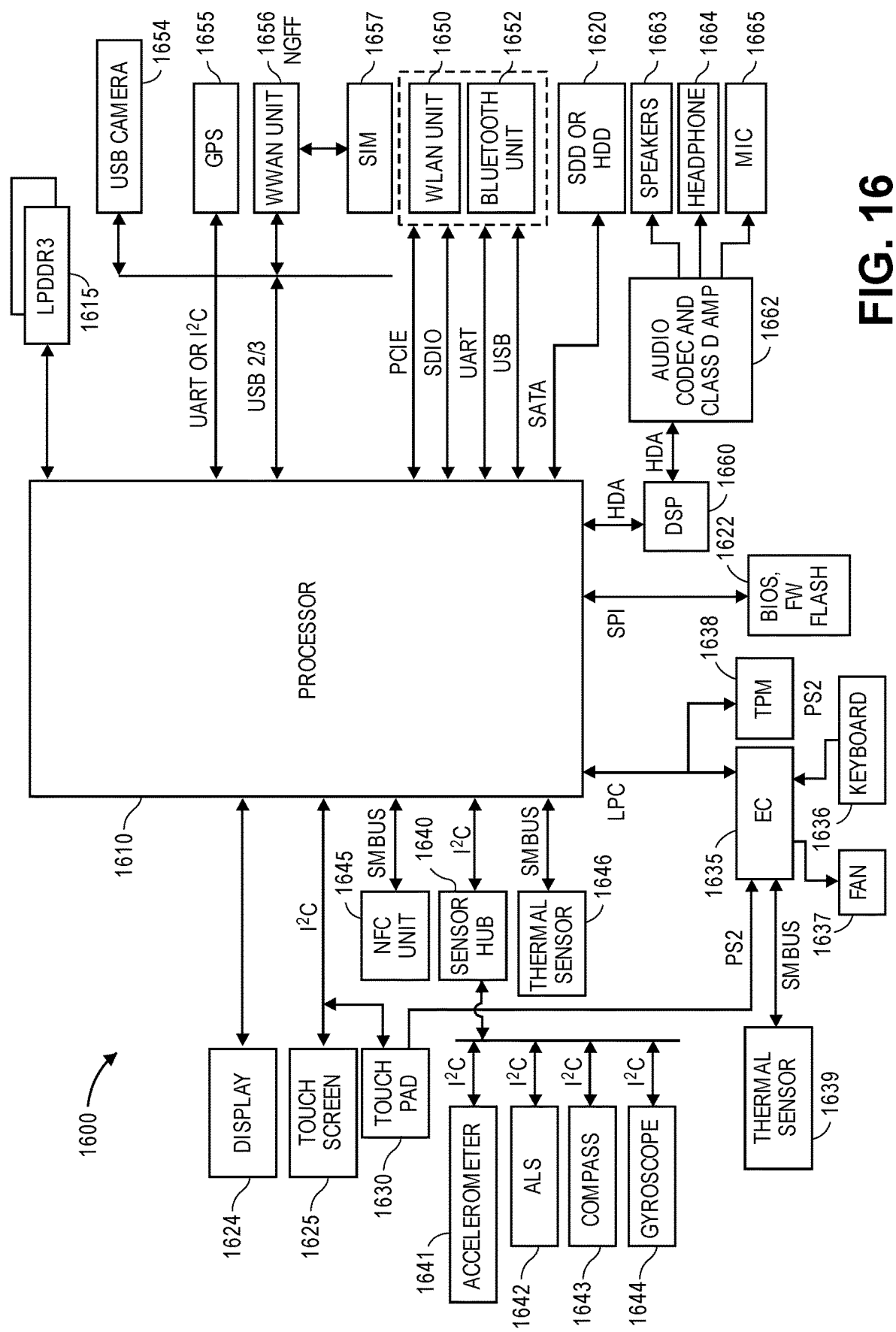
FIG. 16 illustrates an embodiment of a block diagram for a computing system.

Referring now to FIG. 16, a block diagram of components present in a computer system in accordance with embodiments of the disclosure is illustrated. As shown in FIG. 16, system 1600 includes any combination of components.

These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 16 is intended to show a high-level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 16, a processor 1610, in one embodiment, includes a microprocessor, multi-core processor, multi-threaded processor, an ultra-low voltage processor, an embedded processor, or other known processing element. In the illustrated implementation, processor 1610 acts as a main processing unit and central hub for communication with many of the various components of the system 1600. As one example, processor 1610 is implemented as a system on a chip (SoC). As a specific illustrative example, processor 1610 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1610 in one implementation will be discussed further below to provide an illustrative example.

Processor 1610, in one embodiment, communicates with a system memory 1615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2011), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may also couple to processor 1610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 16, a flash device 1622 may be coupled to processor 1610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (TO) devices may be present within system 1600. Specifically shown in the embodiment of FIG. 16 is a display 1624 which may be a high definition LCD or LED panel configured within a lid portion of the chassis. This display panel may also provide for a touch screen 1625, e.g., adapted externally over the display panel such that via a user's interaction with this touch screen, user inputs can be provided to the system to enable desired operations, e.g., with regard to the display of information, accessing of information and so forth. In one embodiment, display 1624 may be coupled to processor 1610 via a display interconnect that can be implemented as a high-performance graphics interconnect. Touch screen 1625 may be coupled to processor 1610 via another interconnect, which in an embodiment can be an I²C interconnect. As further shown in FIG. 16, in addition to touch screen 1625, user input by way of touch can also occur via a touch pad 1630 which may be configured within the chassis and may also be coupled to the same I²C interconnect as touch screen 1625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited I²C interference when using multi-touch.

For perceptual computing and other purposes, various sensors may be present within the system and may be coupled to processor 1610 in different manners. Certain inertial and environmental sensors may couple to processor 1610 through a sensor hub 1640, e.g., via an I²C interconnect. In the embodiment shown in FIG. 16, these sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus). The embodiments may be implemented via USB ports and the processor 1610.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 16, various peripheral devices may couple to processor 1610 via a low pin count (LPC) interconnect. In the embodiment shown, various components can be coupled through an embedded controller (EC) 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus. Note that via this NFC unit 1645, devices in close proximity to each other can communicate. For example, a user can enable system 1600 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 16, additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present. Note that in the embodiment shown in FIG. 16, WWAN unit 1656 and an integrated capture device such as a camera module 1654 may communicate via a given USB protocol, e.g., USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665 which in an embodiment can be implemented via dual array microphones (such as a digital microphone array) to provide for high quality audio inputs to enable voice-activated control of various operations within the system. Note also that audio outputs can be provided from amplifier/CODEC 1662 to a headphone jack 1664. Although shown with these particular components in the embodiment of FIG. 16, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1635. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 17:
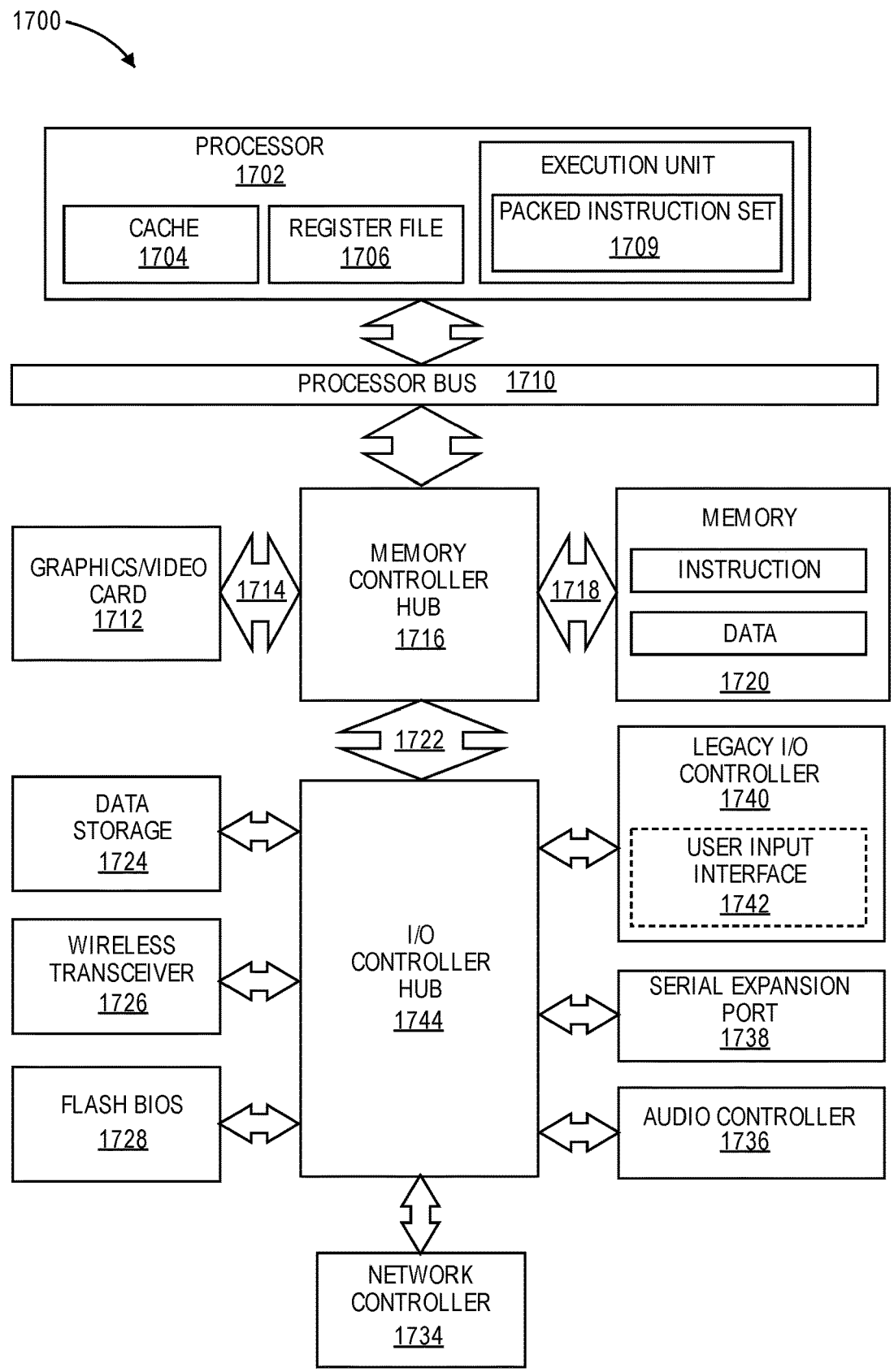
FIG. 17 illustrates another embodiment of a block diagram for a computing system.

Turning to FIG. 17, a block diagram of an exemplary computer system formed with a processor that includes execution units to execute an instruction, where one or more of the interconnects implement one or more features in accordance with embodiments of the disclosure is illustrated. System 1700 includes a component, such as a processor 1702 to employ execution units including logic to perform algorithms for process data, in accordance with the present disclosure, such as in the embodiment described herein. System 1700 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1702 includes one or more execution units 1708 to implement an algorithm that is to perform at least one instruction. One embodiment may be described in the context of a single processor desktop or server system, but alternative embodiments may be included in a multiprocessor system. System 1700 is an example of a 'hub' system architecture. The computer system 1700 includes a processor 1702 to process data signals. The processor 1702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1702 is coupled to a processor bus 1710 that transmits data signals between the processor 1702 and other components in the system 1700. The elements of system 1700 (e.g. graphics accelerator 1712, memory controller hub 1716, memory 1720, I/O controller hub 1744, wireless transceiver 1726, Flash BIOS 1728, Network controller 1734, Audio controller 1736, Serial expansion port 1738, I/O controller 1740, etc.) perform their conventional functions that are well known to those familiar with the art.

In one embodiment, the processor 1702 includes a Level 1 (L1) internal cache memory 1704. Depending on the architecture, the processor 1702 may have a single internal cache or multiple levels of internal caches. Other embodiments include a combination of both internal and external caches depending on the particular implementation and needs. Register file 1706 is to store different types of data in various registers including integer registers, floating point registers, vector registers, banked registers, shadow registers, checkpoint registers, status registers, and instruction pointer register. Embodiments may be implemented via the processor 1702, I/O controller hub 1744, wireless transceiver 1726 and USB ports (e.g., via a USB controller coupled to the I/O controller hub 1744.

Execution unit 1708, including logic to perform integer and floating point operations, also resides in the processor 1702. The processor 1702, in one embodiment, includes a microcode (μcode) ROM to store microcode, which when executed, is to perform algorithms for certain macroinstructions or handle complex scenarios. Here, microcode is potentially updateable to handle logic bugs/fixes for processor 1702. For one embodiment, execution unit 1708 includes logic to handle a packed instruction set 1709. By including the packed instruction set 1709 in the instruction set of a general-purpose processor 1702, along with associated circuitry to execute the instructions, the operations used by many multimedia applications may be performed using packed data in a general-purpose processor 1702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1708 may also be used in micro controllers, embedded processors, graphics devices, DSPs, and other types of logic circuits. System 1700 includes a memory 1720. Memory 1720 includes a dynamic random access memory (DRAM) device, a static random access memory (SRAM) device, flash memory device, or other memory device. Memory 1720 stores instructions and/or data represented by data signals that are to be executed by the processor 1702.

Note that any of the aforementioned features or aspects of the embodiments of the disclosure may be utilized on one or more interconnect illustrated in FIG. 17. For example, an on-die interconnect (ODI), which is not shown, for coupling internal units of processor 1702 implements one or more aspects of the disclosure herein. Or the embodiments of the disclosure are associated with a processor bus 1710 (e.g. Intel Quick Path Interconnect (QPI) or other known high performance computing interconnect), a high bandwidth memory path 1718 to memory 1720, a point-to-point link 1714 to graphics accelerator 1712 (e.g. a Peripheral Component Interconnect express (PCIe) compliant fabric), a controller hub interconnect 1722, an I/O or other interconnect (e.g. USB, PCI, PCIe) for coupling the other illustrated components. Some examples of such components include the audio controller 1736, firmware hub (flash BIOS) 1728, wireless transceiver 1726, data storage 1724, legacy I/O controller 1710 containing user input and keyboard interfaces 1742, a serial expansion port 1738 such as Universal Serial Bus (USB), and a network controller 1734. The data storage device 1724 can comprise a hard disk drive, a floppy disk drive, a CD-ROM device, a flash memory device, or other mass storage device.

Figure 18:
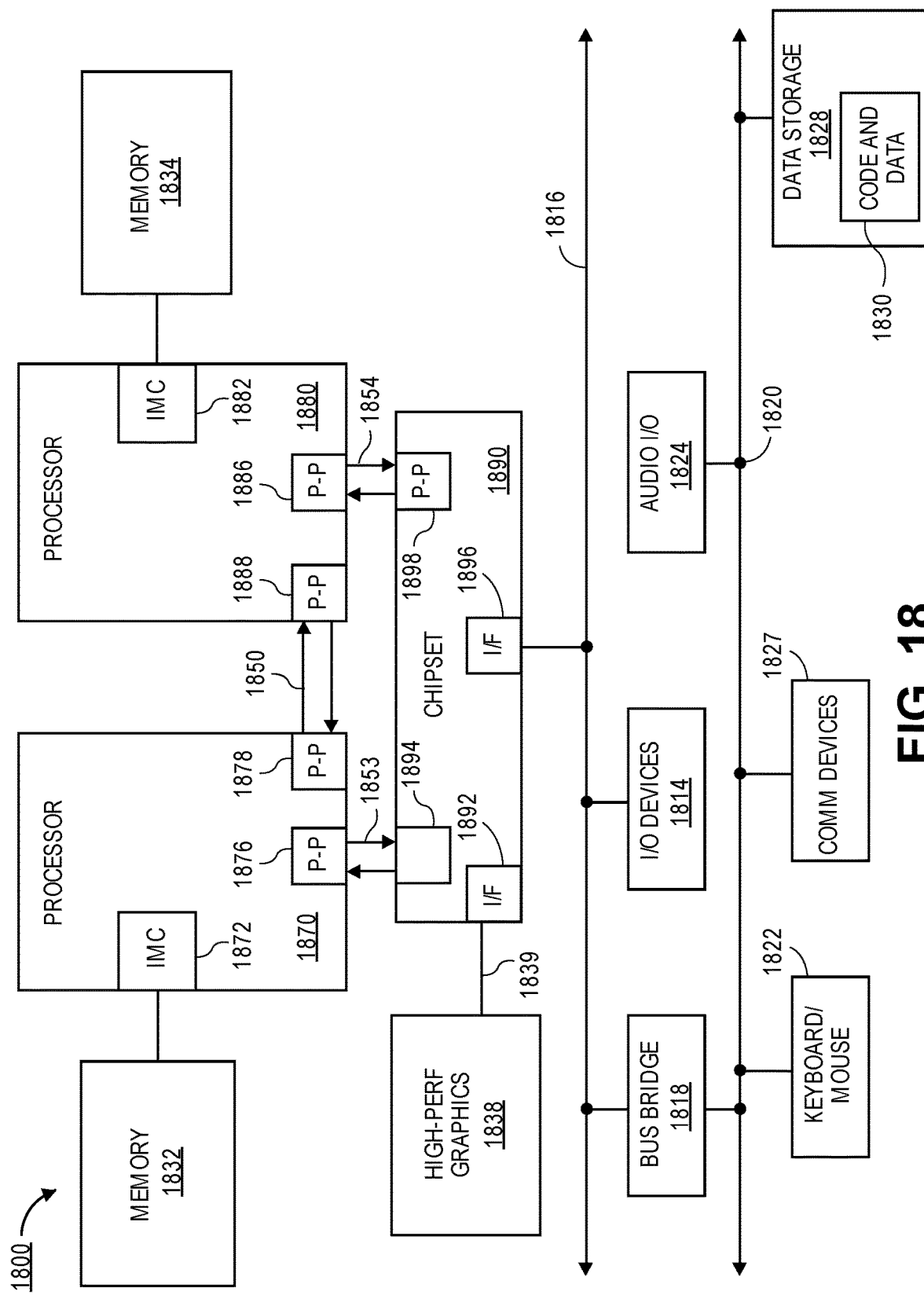
FIG. 18 illustrates another embodiment of a block diagram for a computing system.

Referring now to FIG. 18, shown is a block diagram of a second system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of a processor. In one embodiment, 1852 and 1854 are part of a serial, point-to-point coherent interconnect fabric, such as Intel's Quick Path Interconnect (QPI) architecture. As a result, embodiments of the disclosure may be implemented within the QPI architecture.

While shown with only two processors 1870, 1880, it is to be understood that the scope of the present disclosure is not so limited. In other embodiments, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 each exchange information with a chipset 1890 via individual P-P interfaces 1852, 1854 using point to point interface circuits 1876, 1894, 1886, 1898. Chipset 1890 also exchanges information with a high-performance graphics circuit 1838 via an interface circuit 1892 along a high-performance graphics interconnect 1839.

A shared cache (not shown) may be included in either processor or outside of both processors; yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 are coupled to first bus 1816, along with a bus bridge 1818 which couples first bus 1816 to a second bus 1820. In one embodiment, second bus 1820 includes a low pin count (LPC) bus. Various devices are coupled to second bus 1820 including, for example, a keyboard and/or mouse 1822, communication devices 1827 and a storage unit 1828 such as a disk drive or other mass storage device which often includes instructions/code and data 1830, in one embodiment. Further, an audio I/O 1824 is shown coupled to second bus 1820. Note that other architectures are possible, where the included components and interconnect architectures vary. For example, instead of the point-to-point architecture of FIG. 18, a system may implement a multi-drop bus or other such architecture. Embodiments may be implemented via the processors 1870, 1888, I/O devices 1814, chipset 1890, communication devices 1827 and similar components.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Embodiments

In one embodiment, a device implements communication over an interconnect to support improved power distribution over the interconnect. The device includes a controller to implement a device policy manager (DPM) to manage power allotment over the interconnect, and a battery feedback mechanism coupled to the controller, the battery feedback mechanism to detect a low or dead battery condition of a connected device over the interconnect and to indicate to the DPM to advertise a higher power charging level to the connected device. The battery feedback mechanism includes an analog to digital converter to monitor power consumption of the connected device over the interconnect. The controller includes an emulator to emulate a connection over the interconnect when the device is not executing an operating system or basic input/output system to enable negotiation of the higher power charging level. The controller is configured to advertise a default power charging level over the interconnect and enable a default power level over the interconnect, and in response to the low or dead battery condition to advertise the higher power charging level and enable the higher power charging level on the interconnect. The emulator monitors the interconnect for advertisements of power charging level. The interconnect may a Universal Serial Bus Type-C port. The power charging level can be advertised by a resistance level (Rp) presented on the interconnect.

In another embodiment, a system implements communication over an interconnect to support improved power distribution over the interconnect. The system includes a battery, a processor coupled to the battery, and an integrated input/output controller coupled to the processor, the integrated input/output controller configured to detect power over the interconnect and enable charging of the battery, the integrated input/output controller to monitor the interconnect for an advertisement of power charging level and to configure battery charging according to advertised power charging level, the integrated input/output controller to include an emulator to negotiate a higher power charging level when the processor is not executing an operating system or a basic input/output system is not operating. The integrated input/output controller includes a battery feedback mechanism to detect a low or dead battery condition of a connected device over the interconnect. The integrated input/output controller is configured to execute a device policy manager (DPM) to advertise a higher power charging level to the connected device. The battery feedback mechanism includes an analog to digital converter to monitor power consumption of the connected device over the interconnect. The integrated input/output controller is configured to advertise a default power charging level over the interconnect and enable a default power level over the interconnect, and in response to the low or dead battery condition to advertise the higher power charging level and enable the higher power charging level on the interconnect. The emulator monitors the interconnect for advertisements of power charging level. The interconnect can be a Universal Serial Bus Type-C port. The power charging level can be advertised by a resistance level (Rp) presented on the interconnect.

In a further embodiment, a method manages power distribution over an interconnect. The method includes advertising a default power charging level on the interconnect, determining whether a connected device has a dead or low power state by a battery feedback mechanism monitoring power consumption on the interconnect in response to a failure of the connected device to complete a connection over the interconnect, and increasing a power charging level on the interconnect in response to detecting the dead or low power state of the connected device. In this embodiment, the battery feedback mechanism can include an analog to digital converter to monitor the power consumption of the connected device over the interconnect. The method can further include emulating the connection over the interconnect when the device is not executing an operating system or basic input/output system to enable negotiation of a higher power charging level and monitoring the interconnect for advertisements of power charging level. The interconnect in this embodiment can a Universal Serial Bus Type-C port, and the power charging level can be advertised by a resistance level (Rp) presented on the interconnect.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A device to implement communication over an interconnect to support improved power distribution over the interconnect, the device comprising:
    a controller to implement a device policy manager (DPM) to manage power allotment over the interconnect, the controller to provide a default power over the interconnect to a connected device upon connection to the connected device, the connected device separate and remote from the device; and
    a battery feedback mechanism coupled to the controller, the battery feedback mechanism to detect a low or dead battery condition of the connected device over the interconnect and to indicate to the DPM to advertise a higher power charging level to the connected device, in response to a failure of the connected device to respond to communication from the controller.

2. The device of claim 1, wherein the battery feedback mechanism includes an analog to digital converter to monitor power consumption of the connected device by detecting analog signal conditions on a configuration channel (CC) signal line of the interconnect, where the interconnect is a Universal Serial Bus Type-C interconnect.

3. The device of claim 1, wherein the controller is configured to advertise a default power charging level over the interconnect and enable a default power level over the interconnect, and in response to the low or dead battery condition to advertise the higher power charging level and enable the higher power charging level on the interconnect.

4. The device of claim 1, wherein the interconnect is a Universal Serial Bus Type-C port.

5. The device of claim 1, wherein the power charging level is advertised by a resistance level (Rp) presented on the interconnect.

6. The device of claim 1, wherein the controller includes an emulator to emulate a connection over the interconnect when the device is not executing an operating system or basic input/output system to enable negotiation of the higher power charging level.

7. The device of claim 6, wherein the emulator monitors the interconnect for advertisements of power charging level.

8. A method of a first device to manage power distribution over an interconnect, the method comprising:
    advertising, by the first device, a default power charging level and providing a default power on the interconnect upon connection with a connected device;
    determining whether the connected device has a dead or low power state by a battery feedback mechanism of the first device monitoring power consumption on the interconnect in response to a failure of the connected device to respond to communication and complete a connection over the interconnect with the first device; and
    increasing, by the first device, a power charging level on the interconnect in response to detecting the dead or low power state of the connected device.

9. The method of claim 8, wherein the battery feedback mechanism includes an analog to digital converter to monitor the power consumption of the connected device by detecting analog signal conditions on a configuration channel signal line of the interconnect.

10. The method of claim 8, further comprising:
    emulating the connection over the interconnect when the device is not executing an operating system or basic input/output system to enable negotiation of a higher power charging level.

11. The method of claim 8, further comprising:
    monitoring the interconnect for the advertisement of power charging level.

12. The method of claim 8, wherein the interconnect is a Universal Serial Bus Type-C port, and wherein the power charging level is advertised by a resistance level (Rp) presented on the interconnect.

\* \* \* \* \*